US012563257B2

(12) United States Patent
Yuan et al.

(10) Patent No.: US 12,563,257 B2
(45) Date of Patent: Feb. 24, 2026

(54) VIDEO PRODUCTION METHOD AND DEVICE, APPARATUS, AND STORAGE MEDIUM

(71) Applicant: Beijing Zitiao Network Technology Co., Ltd., Beijing (CN)

(72) Inventors: Shaozhe Yuan, Beijing (CN); Yunhang Li, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/674,662

(22) Filed: May 24, 2024

(65) Prior Publication Data

US 2024/0397138 A1 Nov. 28, 2024

(30) Foreign Application Priority Data

May 25, 2023 (CN) ......................... 202310602624.X

(51) Int. Cl.
*H04N 21/431* (2011.01)
*H04N 21/472* (2011.01)

(52) U.S. Cl.
CPC ..... *H04N 21/4318* (2013.01); *H04N 21/4312* (2013.01); *H04N 21/47217* (2013.01)

(58) Field of Classification Search
CPC ........... H04N 21/4318; H04N 21/4312; H04N 21/47217; H04N 21/854; H04N 21/44016
See application file for complete search history.

(56) References Cited

U.S. PATENT DOCUMENTS

| | | | | |
|---|---|---|---|---|
| 11,265,181 B1 * | 3/2022 | Springer | ........... | H04N 21/4318 |
| 2007/0162854 A1 * | 7/2007 | Kikinis | ................... | G11B 27/34 |
| | | | | 345/473 |
| 2013/0278828 A1 * | 10/2013 | Todd | ................... | H04N 21/4753 |
| | | | | 348/E5.099 |
| 2013/0322848 A1 * | 12/2013 | Li | ........................... | H04N 5/783 |
| | | | | 386/E5.003 |
| 2013/0343726 A1 * | 12/2013 | Shackleton | ........... | G06F 16/735 |
| | | | | 386/282 |
| 2014/0229836 A1 * | 8/2014 | Young | ................ | H04N 21/4312 |
| | | | | 715/721 |
| 2014/0253801 A1 * | 9/2014 | Richman | ........... | H04N 21/4312 |
| | | | | 348/564 |
| 2014/0321832 A1 * | 10/2014 | Shore | ................. | G06Q 30/0631 |
| | | | | 386/280 |

(Continued)

FOREIGN PATENT DOCUMENTS

| | | | | |
|---|---|---|---|---|
| CN | 103336686 A | 10/2013 | | |
| CN | 113438532 A | * 9/2021 | ........... | G11B 27/031 |
| CN | 115442539 A | 12/2022 | | |

*Primary Examiner* — Fernando Alcon
(74) *Attorney, Agent, or Firm* — Astute IP Law Group

(57) ABSTRACT

A video production method and device, an apparatus and a storage medium. The method includes: displaying a material card for video production in a material adding area of a displayed video production interface; in response to a selection operation for the material card in the material adding area, displaying, in a card editing area of the video production interface, one or more material elements contained in the selected material card; and in response to a triggered video presentation operation, playing a video content in a video presentation interface.

17 Claims, 14 Drawing Sheets

(56) References Cited

U.S. PATENT DOCUMENTS

| | | | |
|---|---|---|---|
| 2015/0088977 A1* | 3/2015 | Monesson | H04L 65/765 |
| | | | 709/203 |
| 2015/0117840 A1* | 4/2015 | Parente | G11B 27/34 |
| | | | 386/282 |
| 2017/0024110 A1* | 1/2017 | Xu | H04N 5/772 |
| 2018/0367826 A1* | 12/2018 | Lee | H04N 21/47205 |
| 2019/0108856 A1* | 4/2019 | Shore | G11B 27/34 |
| 2020/0007956 A1* | 1/2020 | Mathur | G06Q 10/103 |
| 2021/0132783 A1* | 5/2021 | Chung | G06F 3/04886 |
| 2021/0134328 A1* | 5/2021 | Chung | G06F 3/0481 |
| 2022/0329922 A1* | 10/2022 | Chen | G11B 27/031 |
| 2022/0377407 A1* | 11/2022 | Marchuk | H04N 21/8547 |
| 2022/0383907 A1* | 12/2022 | Zhang | H04N 21/8547 |
| 2023/0038412 A1* | 2/2023 | Howell | G06F 3/0482 |
| 2024/0233768 A1* | 7/2024 | Braunstein | G11B 27/031 |

* cited by examiner

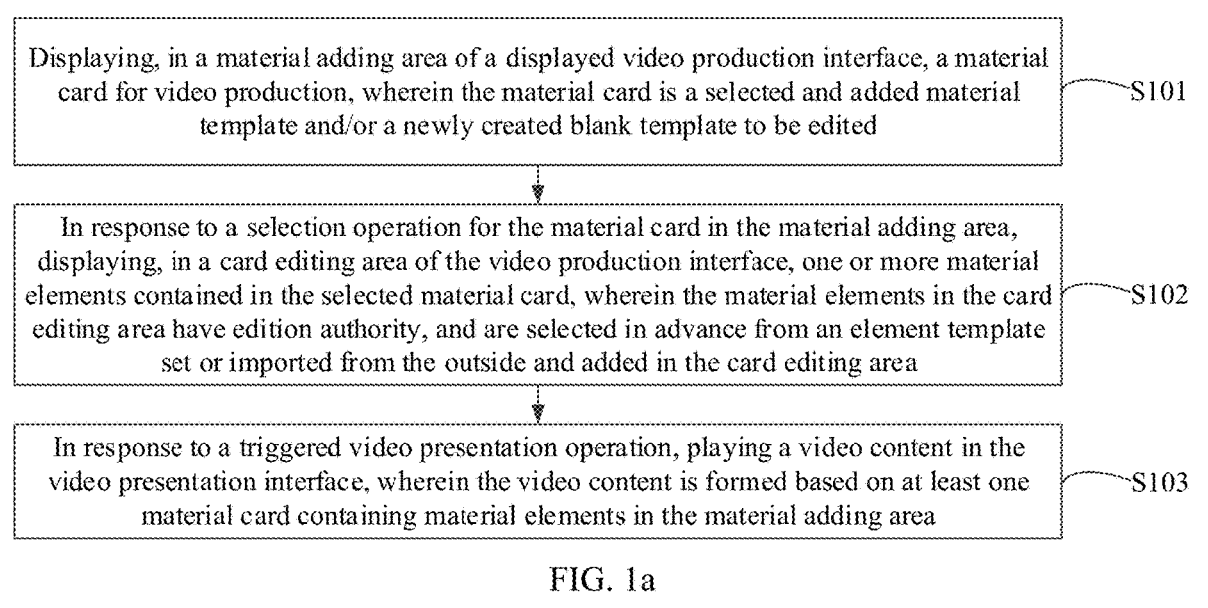

Displaying, in a material adding area of a displayed video production interface, a material card for video production, wherein the material card is a selected and added material template and/or a newly created blank template to be edited ⌐ ‾S101

In response to a selection operation for the material card in the material adding area, displaying, in a card editing area of the video production interface, one or more material elements contained in the selected material card, wherein the material elements in the card editing area have edition authority, and are selected in advance from an element template set or imported from the outside and added in the card editing area ⌐ ‾S102

In response to a triggered video presentation operation, playing a video content in the video presentation interface, wherein the video content is formed based on at least one material card containing material elements in the material adding area ⌐ ‾S103

FIG. 1a

VIDEO PRODUCTION METHOD AND DEVICE, APPARATUS, AND STORAGE MEDIUM

CROSS-REFERENCE TO RELATED APPLICATION(S)

This application claims the priority of Chinese patent application No. 202310602624.X filed on May 25, 2023, the disclosure of which is incorporated herein in its entirety by reference as a part of this application.

TECHNICAL FIELD

Embodiments of the present disclosure relate to the technical field of video processing, in particular to a video production method and device, an apparatus and a storage medium.

BACKGROUND

At present, video producers can make videos through video editors. There are material templates provided in the video editor, and the material templates often contain pre-designed playback formats or effects, so that video producers can directly apply the material templates to produce the required videos.

When applying the material template for video production, the selected material template is presented on the editing track of the video production interface. The video producer can only replace the material content contained in the material template on the editing track, but the playback form and effects can't be adjusted. At the same time, the playback duration of the material template can't be delayed, either. The form of the whole video editing process is too simple to ensure the flexibility of video production.

SUMMARY

The present disclosure provides a video production method and device, an apparatus and a storage medium, so as to enrich video editing forms and ensure the flexibility of video production.

An embodiment of the present disclosure provides a video production method, including:

displaying a material card for video production in a material adding area of a displayed video production interface, wherein the material card is a selected and added material template and/or a newly created blank template to be edited;

in response to a selection operation for the material card in the material adding area, displaying, in a card editing area of the video production interface, one or more material elements contained in the selected material card, wherein each material element in the card editing area has edition authority, and the material element is selected from an element template set in advance or imported from outside and is added in the card editing area;

in response to a triggered video presentation operation, playing a video content in a video presentation interface, wherein the video content is formed based on at least one material card containing the material element in the material adding area.

An embodiment of the present disclosure also provides a video production device, including:

a card display module, configured to display a material card for video production in a material adding area of a displayed video production interface, wherein the material card is a selected and added material template and/or a newly created blank template to be edited;

a material display module, configured to display, in a card editing area of the video production interface, one or more material elements contained in the selected material card in response to a selection operation for the material card in the material adding area, wherein each material element in the card editing area has edition authority, and the material element is selected from a element template set in advance or imported from outside and is added in the card editing area; and a video playback module, configured to play a video content in the video presentation interface in response to a triggered video presentation operation, wherein the video content is formed based on at least one material card containing the material element in the material adding area.

An embodiment of the present disclosure also provides an electronic apparatus, including:

one or more processors; and a storage device for storing one or more programs, wherein when the one or more programs are executed by the one or more processors, the one or more processors are configured to implement the video production method according to any embodiment of the present disclosure.

An embodiment of the present disclosure also provides a storage medium on which a computer program is stored, wherein the program, when executed by a computer processor, is configured to perform the video production method according to any embodiment of the present invention.

BRIEF DESCRIPTION OF DRAWINGS

The above and other features, advantages and aspects of embodiments of the present disclosure will become more apparent by referring to the following detailed description when taken in conjunction with the accompanying drawings. Throughout the drawings, the same or similar reference numerals indicate the same or similar elements. It should be understood that the drawings are schematic, and the components and elements are not necessarily drawn to scale.

FIG. 1a shows a flowchart of a video production method provided by an embodiment of the present disclosure;

FIG. 2d shows a schematic diagram of dragging a material element based on a card editing area presented in the

Figure 2A:
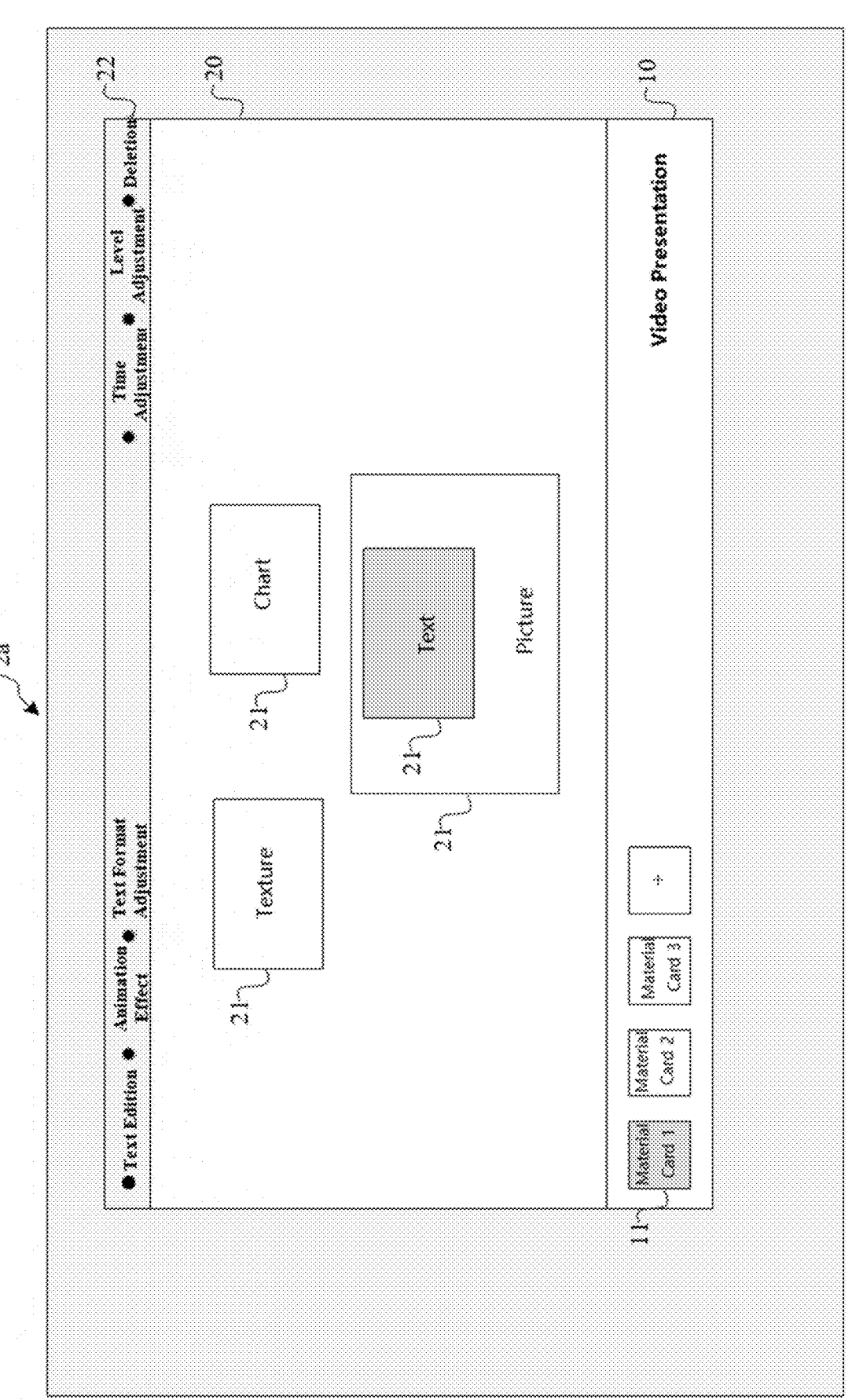
FIG. 2a shows a schematic diagram of an editing column presented in the displayed video production interface in the video production method provided by the embodiment of the present disclosure.
Figure 2B:
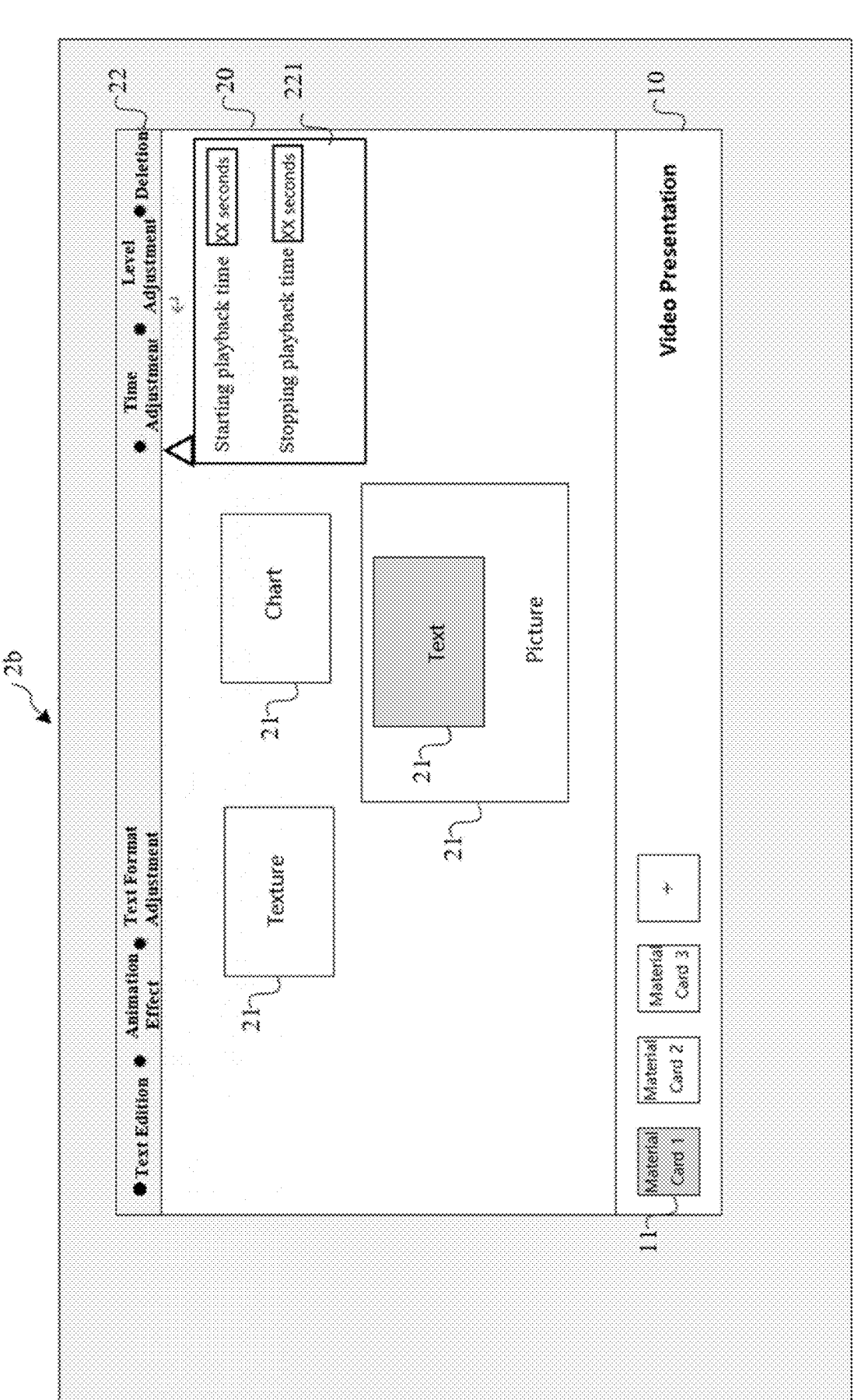
FIG. 2b shows a schematic diagram of time adjustment based on the editing column presented in the displayed video production interface in the video production method provided by the embodiment of the present disclosure.
Figure 2C:
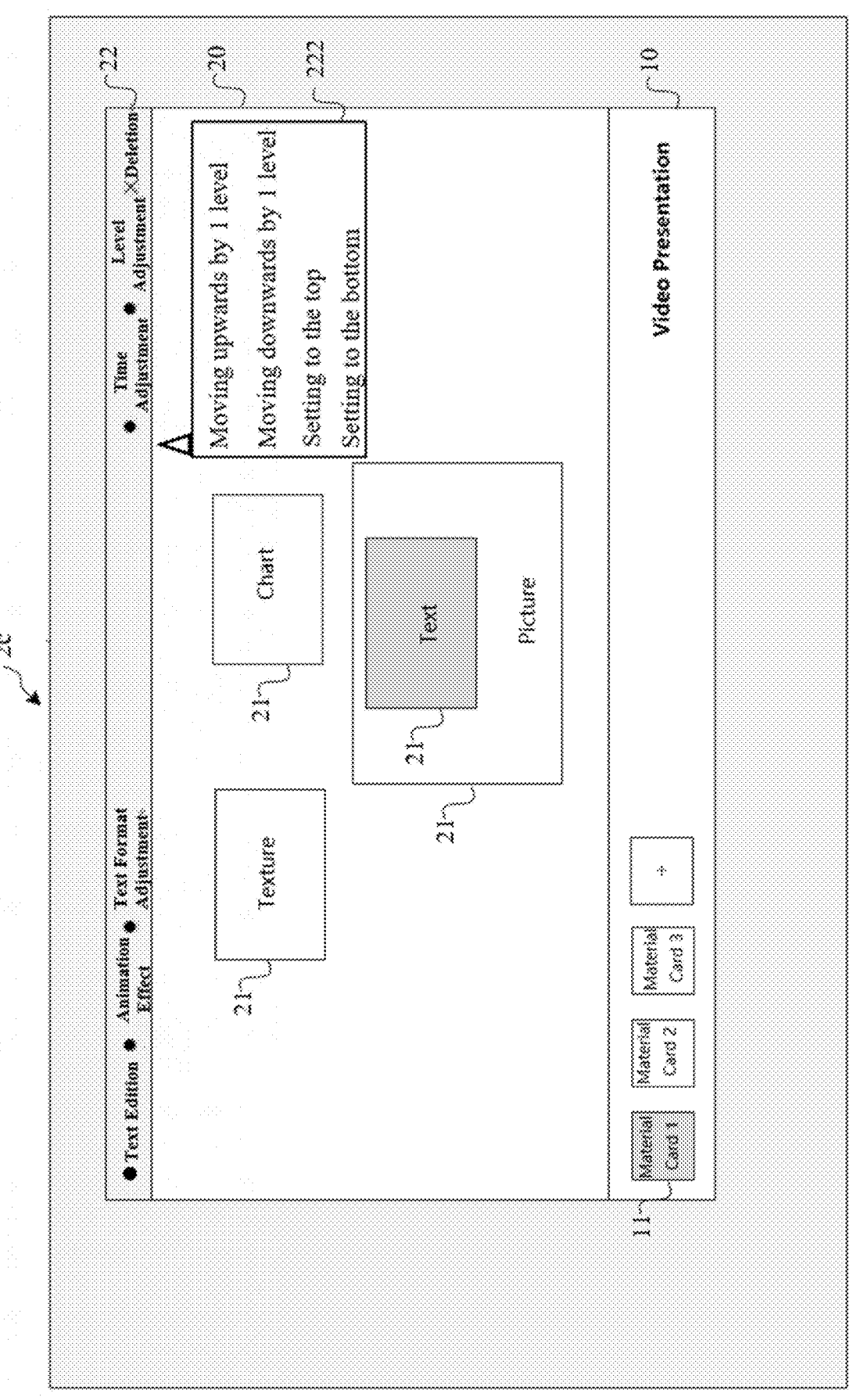
FIG. 2c shows a schematic diagram of level adjustment based on the editing column presented in the displayed video production interface in the video production method provided by the embodiment of the present disclosure.
Figure 2D:
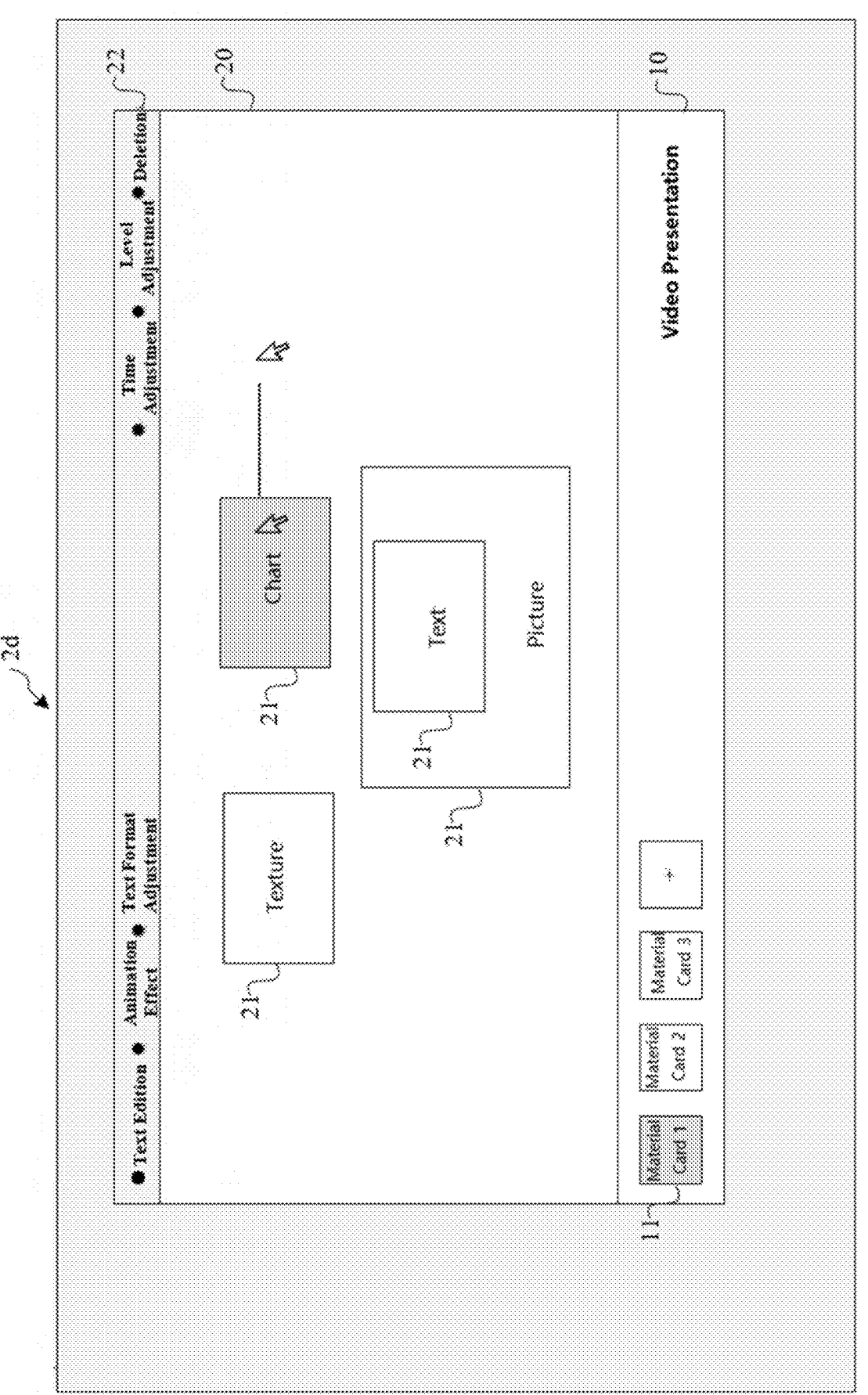
Figure 2E:
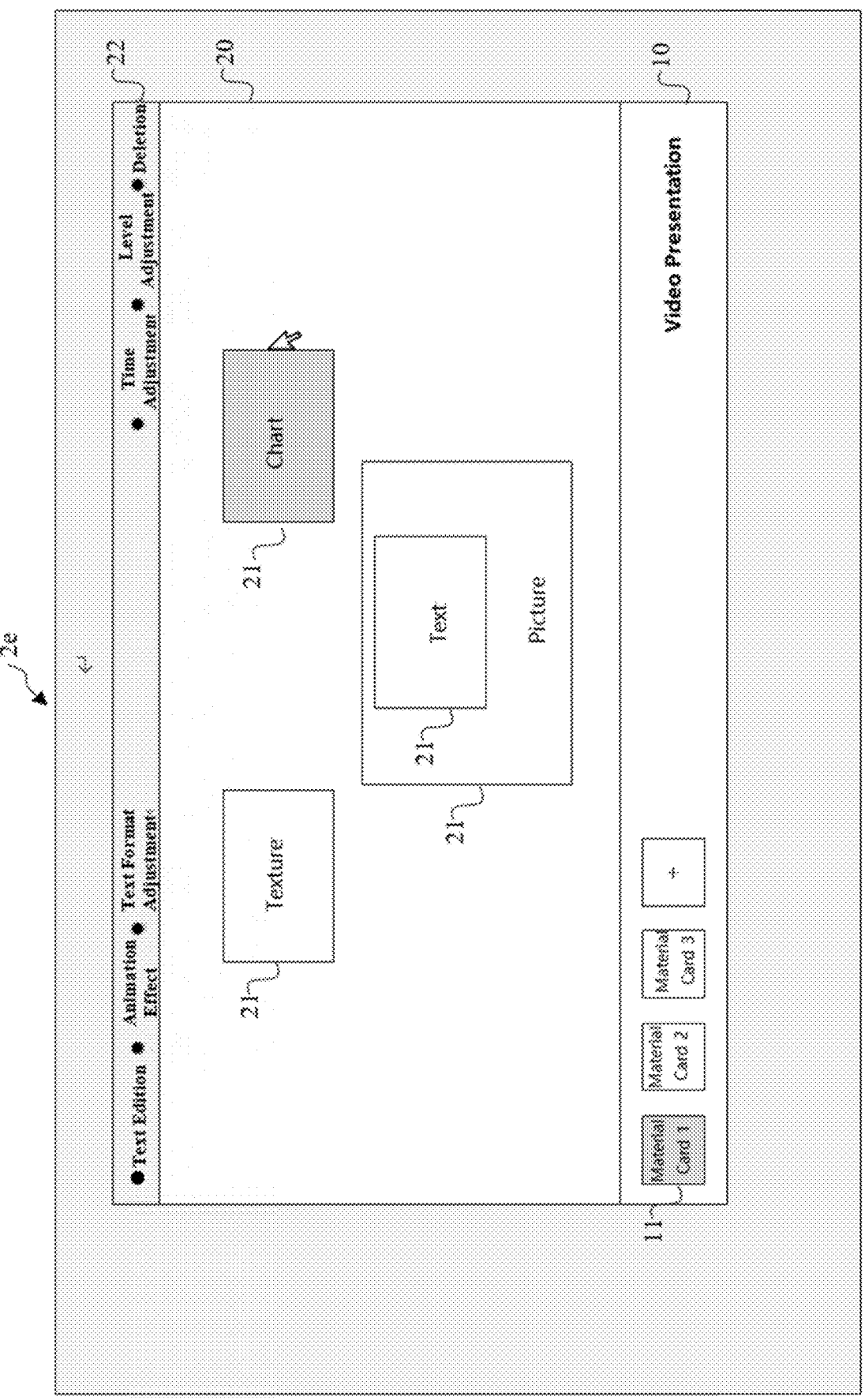
Figure 2F:
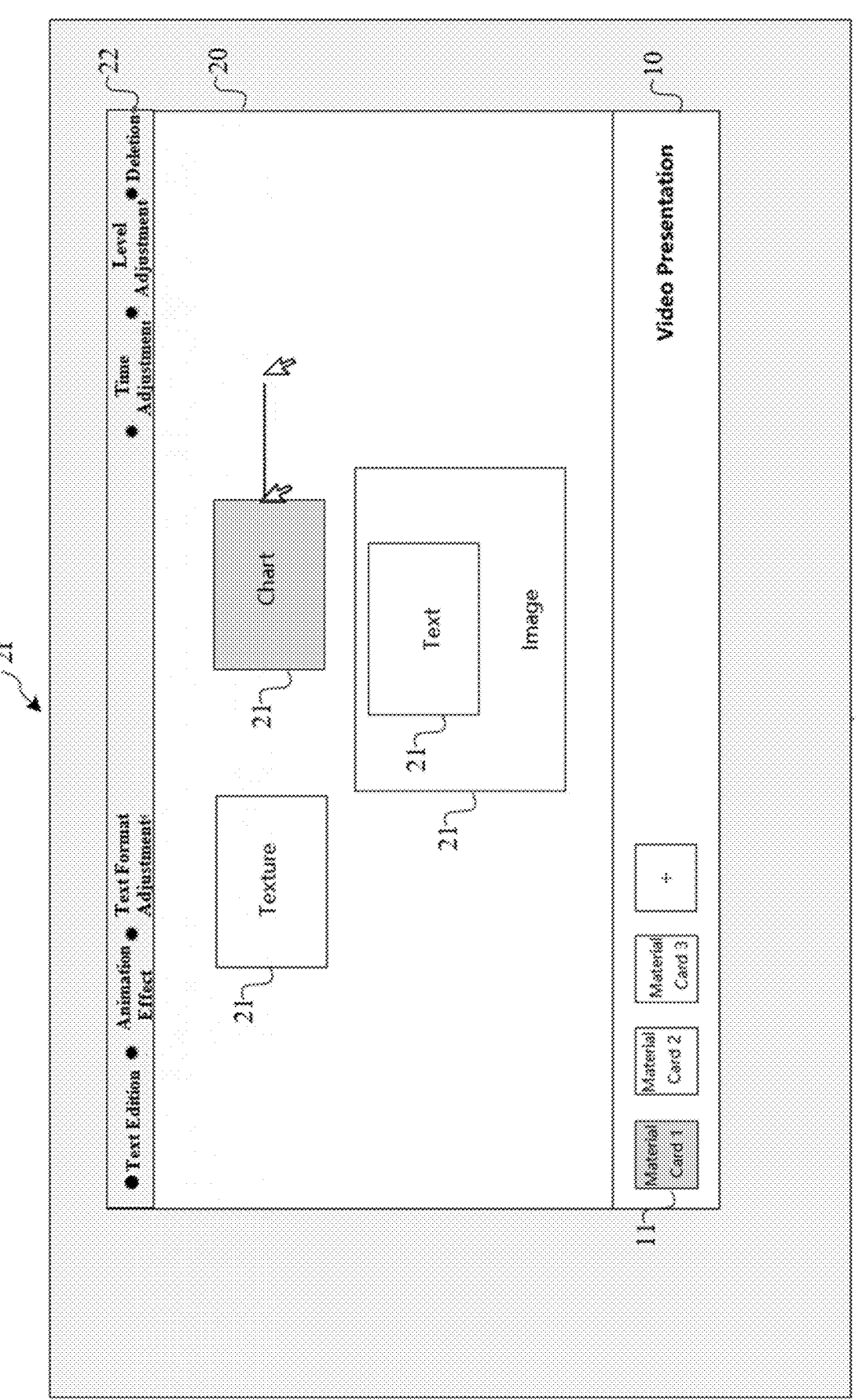
Figure 2G:
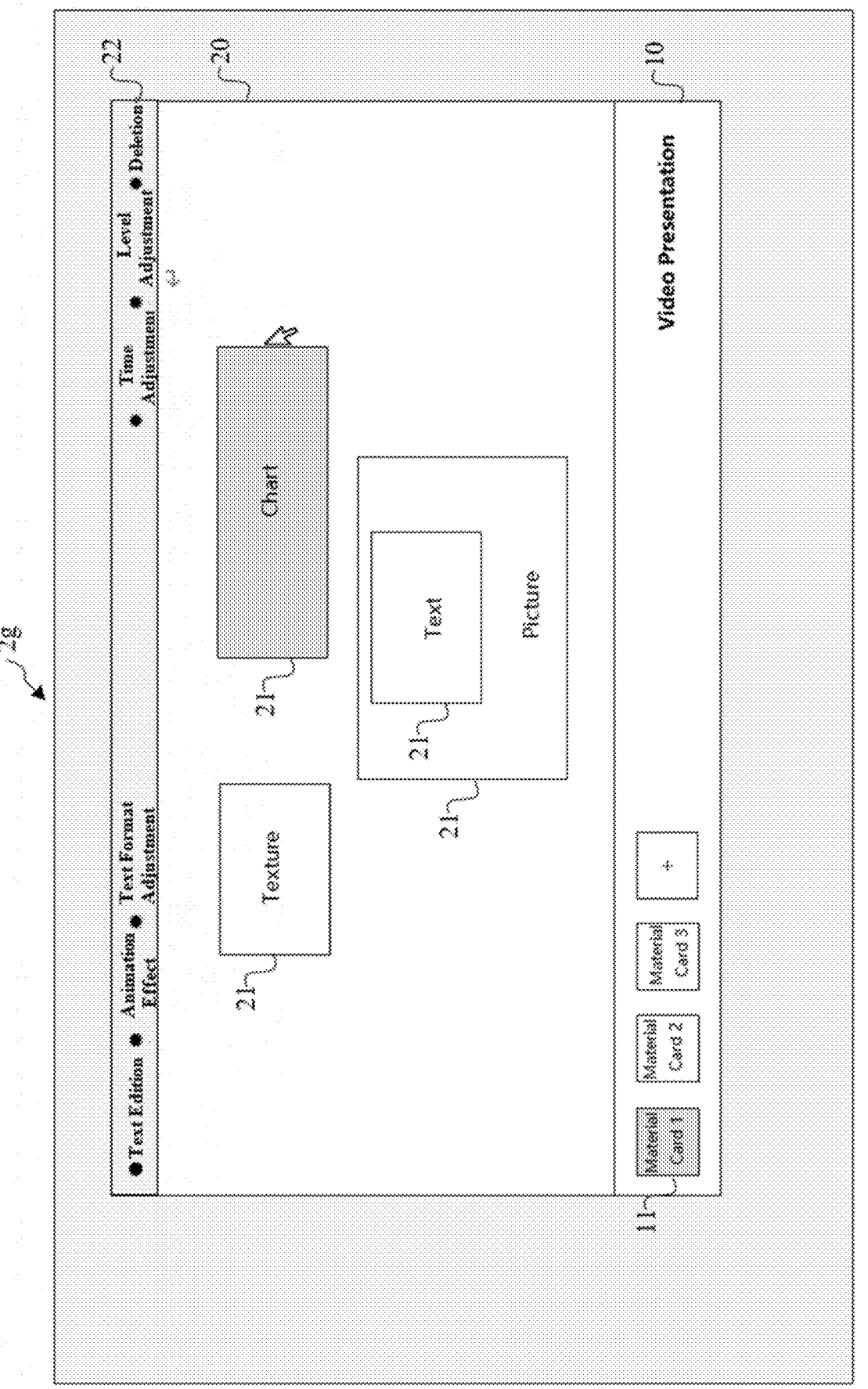
Figure 3:
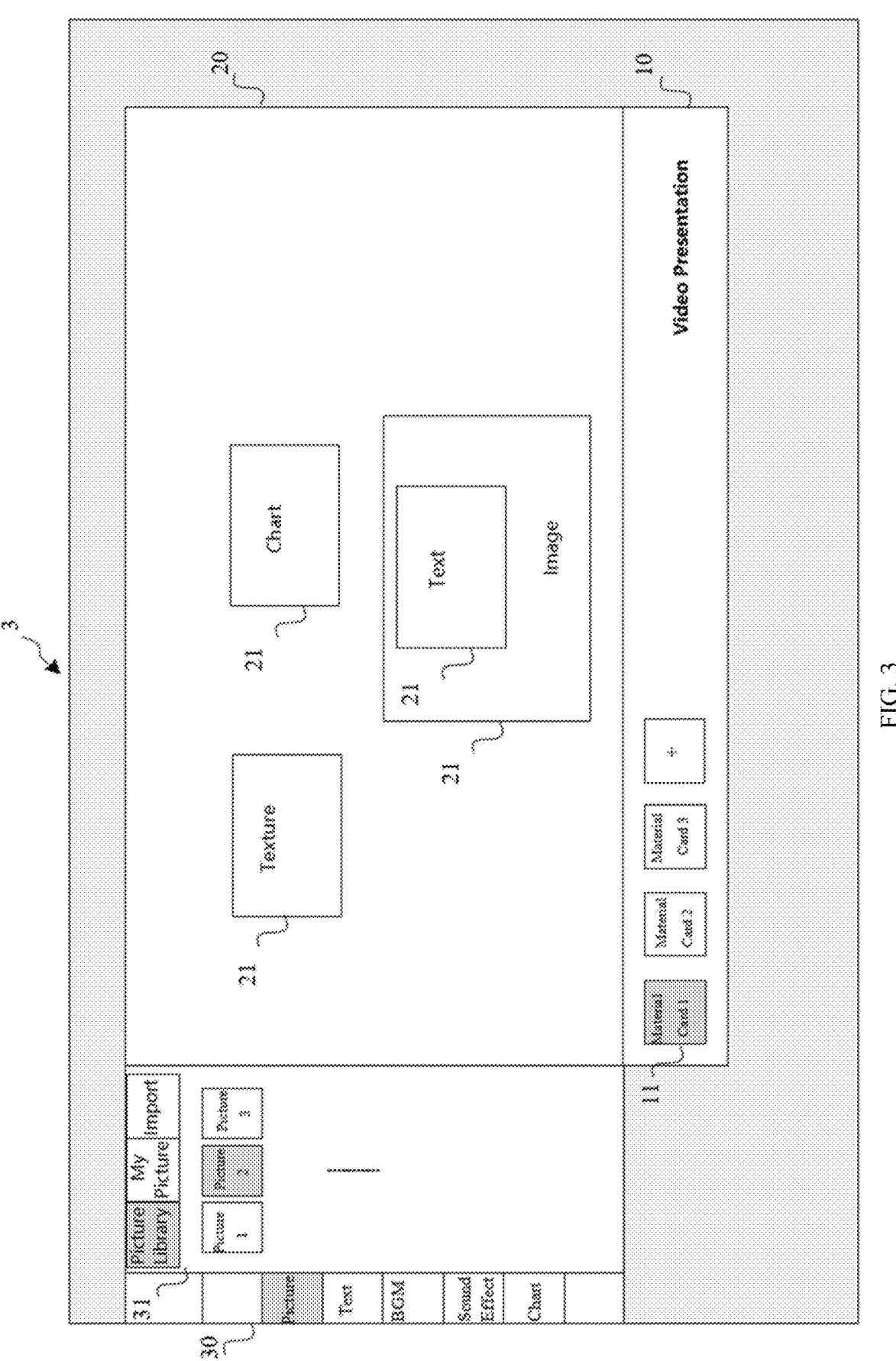
Figure 4:
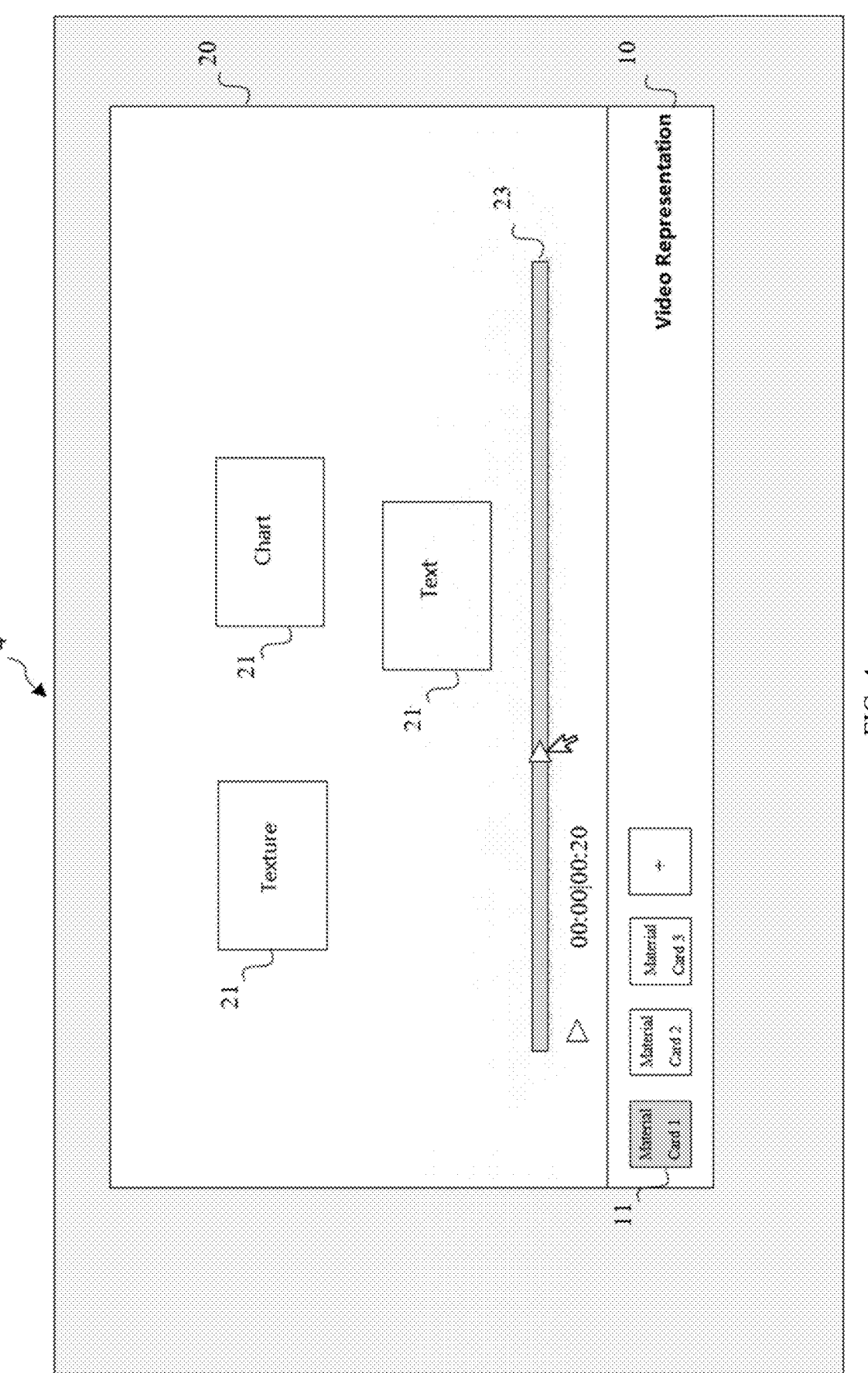
Figure 5:
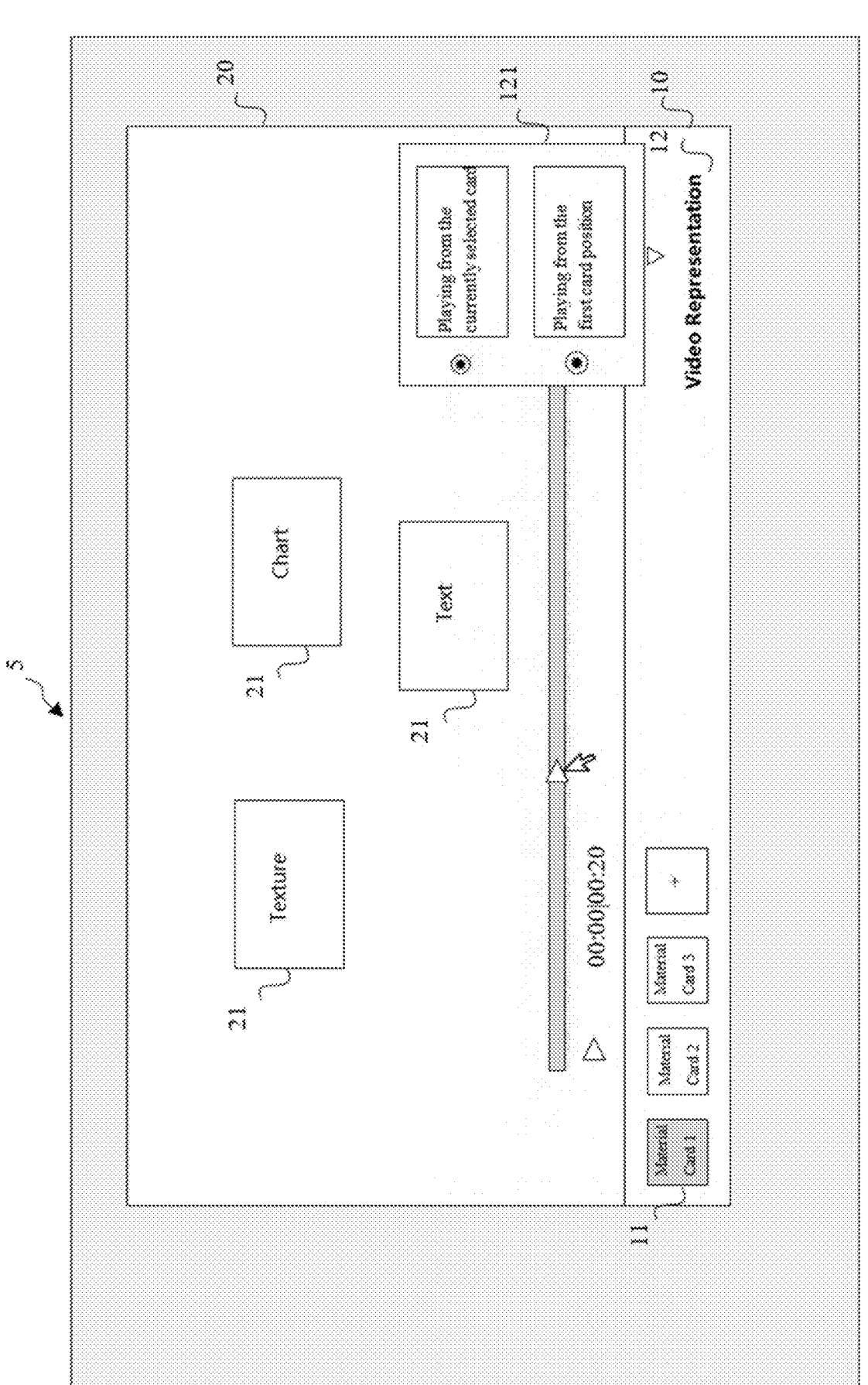
Figure 6:
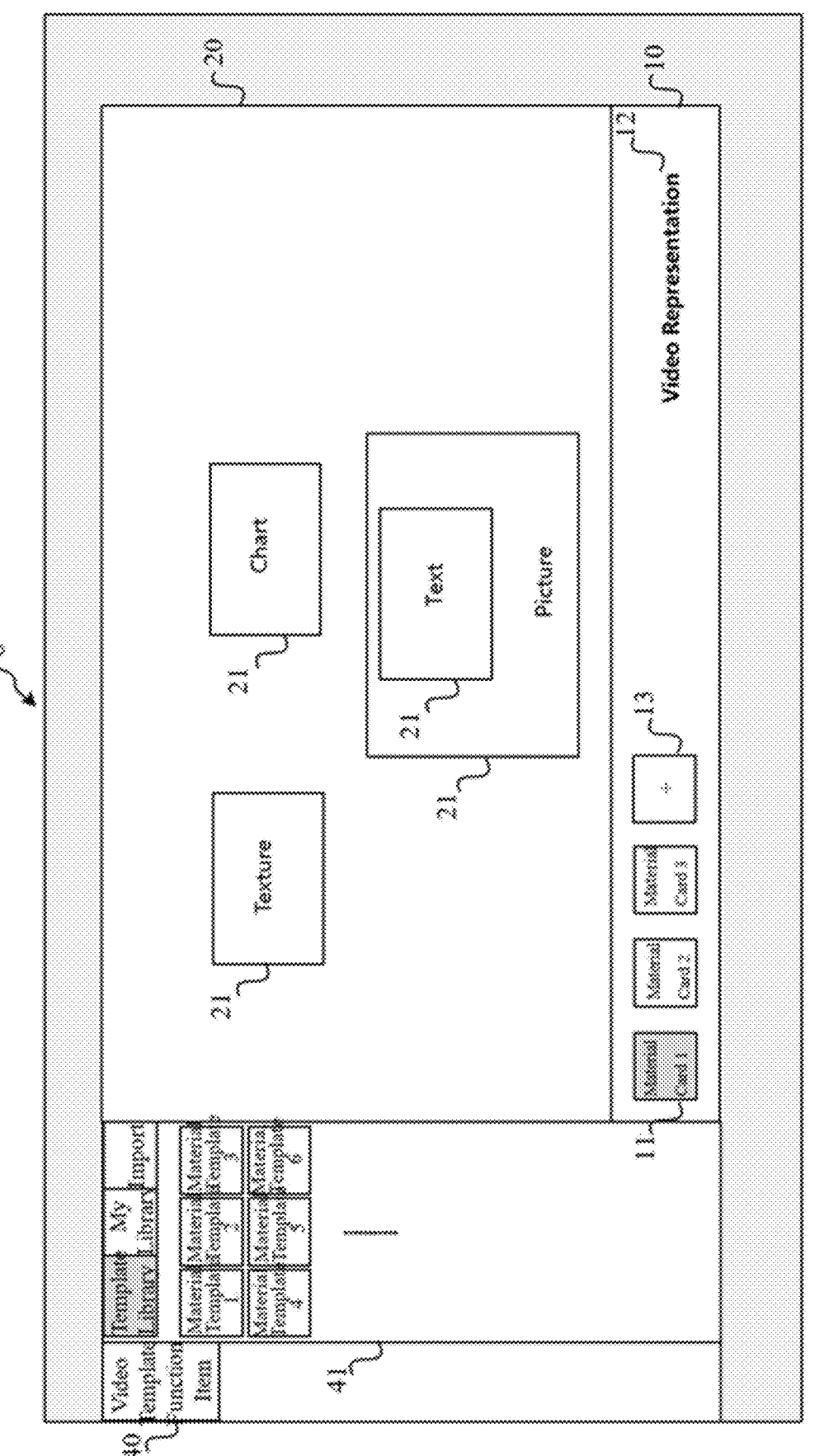
Figure 7:
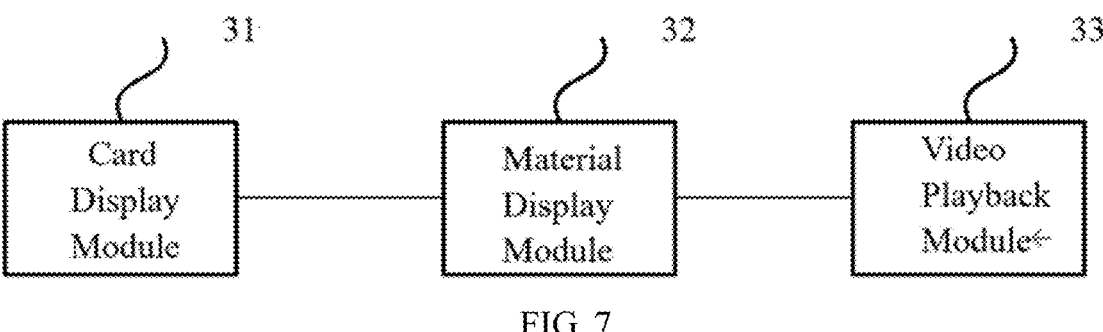
Figure 8:
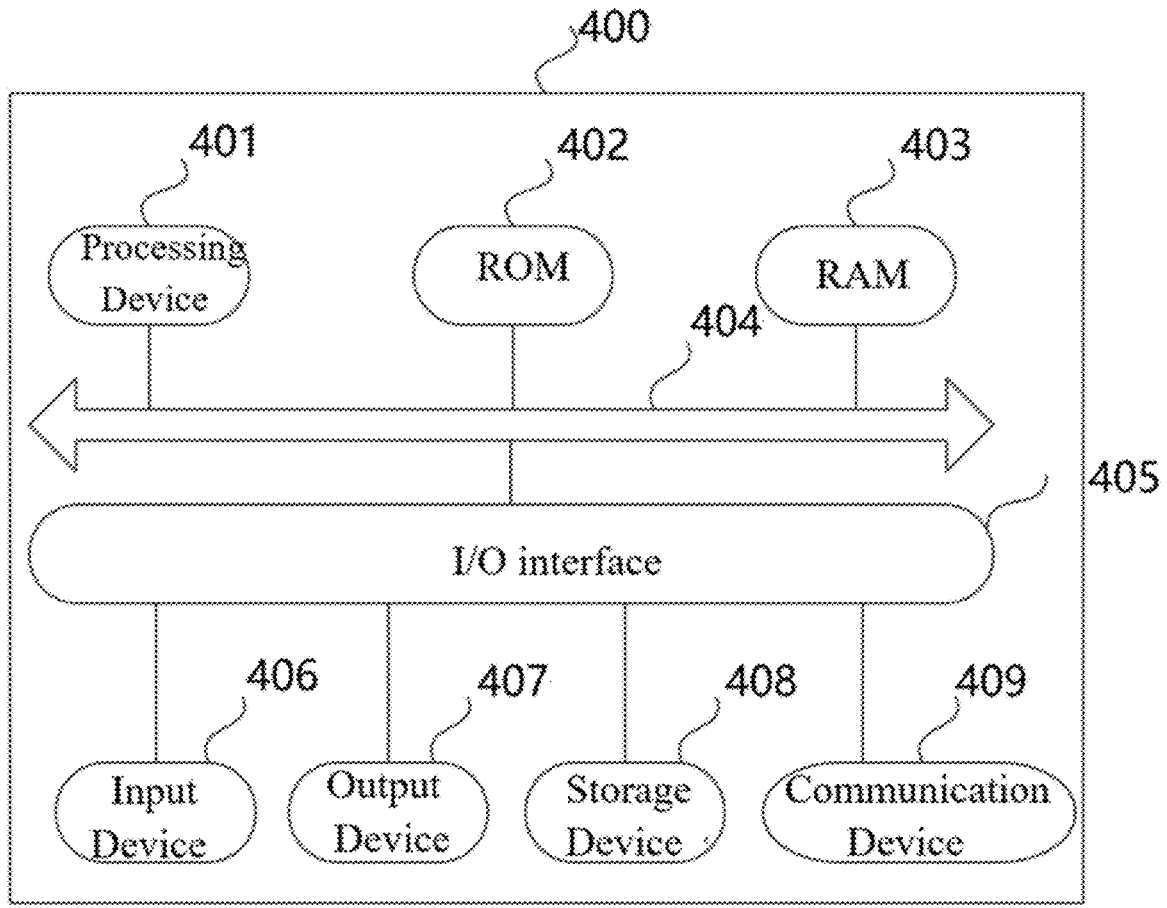

US 12,563,257 B2 displayed video production interface in the video production method provided by the embodiment of the present disclosure;

FIG. 2e shows a presentation example of the video production method provided by the embodiment of the present disclosure after moving a position of the material element based on the card editing area presented in the displayed video production interface;

FIG. 2f shows a schematic diagram of size adjustment of the material element based on the card editing area presented in the displayed video production interface in the video production method provided by the embodiment of the present disclosure;

FIG. 2g shows a presentation example of the video production method provided by the embodiment of the present disclosure after the size adjustment of the material element based on the card editing area presented in the displayed video production interface;

FIG. 3 shows a schematic diagram of a material production navigation column presented in the displayed video production interface in the video production method provided by the embodiment of the present disclosure;

FIG. 4 shows a schematic diagram of a progress bar in the card editing area presented in the displayed video production interface in the video production method provided by the embodiment of the present disclosure;

FIG. 5 shows a schematic diagram of a playback mode selection window presented in the video production interface in the video production method provided by the embodiment of the present disclosure;

FIG. 6 shows a schematic diagram of adding a material template in the video production interface displayed in the video production method provided by the embodiment of the present disclosure;

FIG. 7 is a schematic structural diagram of a video production device provided by an embodiment of the present disclosure; and FIG. 8 shows a schematic structural diagram of an electronic apparatus provided by an embodiment of the present disclosure.

DETAILED DESCRIPTION

Embodiments of the present disclosure will be described in more detail below with reference to the accompanying drawings. Although some embodiments of the present disclosure are shown in the drawings, it should be understood that the present disclosure can be embodied in various forms and should not be construed as limited to the embodiments set forth here, but rather, these embodiments are provided for a more thorough and complete understanding of the present disclosure. It should be understood that the drawings and embodiments of the present disclosure are only used for illustrative purposes, and are not used to limit the protection scope of the present disclosure.

It should be understood that the steps described in the method embodiments of the present disclosure may be performed in a different order and/or in parallel. Furthermore, method embodiments may include additional steps and/or omit performing the illustrated steps. The scope of the present disclosure is not limited in this respect.

As used herein, the term "including/comprising" and its variants are open-ended, that is, "including/comprising but not limited to". The term "based on" refers to "at least partially based on". The term "one embodiment" means "at least two embodiments"; the term "another embodiment" means "at least two other embodiments"; the term "some embodiments" means "at least some embodiments". Related definitions of other terms will be given in the following description.

It should be noted that the concepts of "first" and "second" mentioned in the present disclosure are only used to distinguish different devices, modules or units, and are not used to limit the order or interdependence of the functions performed by these devices, modules or units.

It should be noted that the qualifiers such as "one" and "a plurality" mentioned in the present disclosure are schematic rather than limiting, and those skilled in the art should understand that unless the context clearly indicates otherwise, they should be understood as "one or more".

Names of messages or information exchanged among multiple devices in the embodiments of the present disclosure are only used for illustrative purposes, and are not used to limit the scope of these messages or information.

It can be understood that before using the technical solutions disclosed in various embodiments of the present disclosure, users should be informed of the types, scope of usage, usage scenarios, etc. of personal information involved in the present disclosure in an appropriate way according to relevant laws and regulations, and the authorizations from users are required.

For example, in response to receiving the user's active request, prompt information is sent to the user to clearly remind the user that the operation requested by the user will require obtaining and using the user's personal information. Therefore, the user can independently choose whether to provide personal information to software or hardware such as electronic apparatuses, applications, servers or storage mediums that perform the operations of the technical solution of the present disclosure according to the prompt information.

As an optional but non-limiting implementation, in response to receiving the user's active request, the way to send the prompt information to the user can be, for example, a pop-up window, in which the prompt information can be presented in text. In addition, the pop-up window can also carry a selection control for the user to choose "agree" or "disagree" to provide personal information to the electronic apparatus.

It can be understood that the above process of notifying and obtaining user authorization is only schematic, and does not limit the implementation of the present disclosure. Other ways to satisfy relevant laws and regulations can also be applied to the implementation of the present disclosure.

It can be understood that the data involved in this technical solution (including but not limited to the data itself, data acquisition or data usage) shall comply with the requirements of corresponding laws, regulations and relevant articles.

There are material templates provided in the video editor, which often contain pre-designed playback formats or effects, so that video producers can directly apply the material templates to make the required videos.

When applying the material template for video production, the selected material template is presented on the editing track of the video production interface. The video producer can only replace the material content contained in the material template on the editing track, but the playback form and effects can't be adjusted. At the same time, the playback duration of the material template can't be delayed, either. The form of the whole video editing process is too simple to ensure the flexibility of video production.

In addition, the existing video editors can directly divide the editing tracks for the material clips and configuration contents after obtaining the material clips needed for video editing or making relevant configuration contents, so as to present the material clips and configuration contents on their respective editing tracks.

Video producers can edit the playback duration and playing order of material clips on the editing track. Video producers can also adjust the position or length of the configuration content on the editing track to determine the material fragment and presentation duration involved in the configuration effect presented by the configuration content. However, the operation of this editing method is relatively complicated, and the available editing form is too simple.

It can be understood that at present, when there is an application demand for editing with material templates to form videos with certain effects, video producers apply the corresponding material templates for video production according to the demand, the selected material templates are presented on the editing track of the video production interface, and the video producers can only replace the material content contained in the material templates on the editing track. The playback form and effects cannot be adjusted, and the playback duration of the material template cannot be delayed, either. The form of the whole video editing process is too simple to ensure the flexibility of video production. Illustratively, taking the video production based on the material template in the prior art as an example, it is assumed that the video producer selects a material template with the effect of "snowflake falling" for video production, the material content of the material template is "earth picture" and the playback duration of the material is "10 seconds". For the material template, when the video producer selects the material template, the material template is presented on the editing track of the video production interface, and the video producer can only replace the material content "earth picture" with the desired material picture by clicking a content replacement control on the editing track. However, if it's desired to change the "snowflake falling" effect to "raindrop" effect, or prolong the playback time of the material, it's not editable.

Based on this, an embodiment of the present disclosure provides a video production method, and FIG. 1a shows a flow chart of the video production method provided by the embodiment of the present disclosure. The embodiment of the present disclosure is suitable for video production using material templates, and the method can be performed by a video production device, which can be implemented in the form of software and/or hardware, or alternatively, by electronic apparatus, preferably mobile terminals, desktops, notebook computers, servers and the like.

It can be understood that the executive subject of the video production method provided by this embodiment can be a video production platform with electronic apparatus as the executive carrier. For example, a video producer can enter the video production platform by triggering the running entrance of the video production platform on the electronic apparatus, and For example, simple and effective video production can be realized on the video production platform through the video production method provided by this embodiment.

As shown in FIG. 1a, the video production method provided by the embodiment of the present disclosure may include:

S101, displaying, in a material adding area of a displayed video production interface, a material card for video production. The material card is a selected and added material template and/or a newly created blank template to be edited.

In this embodiment, the displayed video production interface corresponds to the video production task, and one video production interface is displayed for each video production task. Before the production of a new video, it can create a task corresponding to the video to be produced by triggering a video production task creation control. Creating a task is equivalent to entering a video production portal. It can enter a new video production interface by creating a task.

In the video production interface, an area can be included to display the designed and produced material template, which can be a default material template of the video production platform. It can be considered that the default material template of the video production platform was set by the developer when the video production platform was developed, and this kind of material template can be included under the category of "template library". For example, when the control "Template Library" is triggered, this area displays the material templates contained in the "Template Library" that have been set by the developer. The material template can also be a material template saved by the video producer after editing by himself/herself, and this kind of material template can be included under the category of "My Template". For example, when the control "My Template" is triggered, this area displays the material templates contained in the "My Template" that have been previously edited and saved by the video producer. Of course, the material templates can also be classified by other tag types, so that the material templates contained in a tag type can be displayed by clicking a control of this tag type. For example, the material templates can also be displayed in the form of "Team Template".

It can be understood that, the designed and produced material templates are displayed in the above-described area. When a video producer wants to use a certain material template for video production, a required material template can be selected from the above-mentioned area and the material template can be added to the material adding area. For example, the selected material can be added to the material adding area by triggering an adding control in the area of designed and produced material templates.

In this embodiment, the displayed video production interface includes a material adding area, and the material adding area displays material cards used for video production. The material card is a selected and added material template and/or a newly created blank template to be edited. Among them, the selected and added material template can be considered as the required material template selected by the video producer from the above designed and produced material templates and added to the material adding area. One material template is selected from the displayed material templates, and if it desires to use this material template, the selected material template is added to the material adding area; the material template is displayed in the form of a material card.

The above description shows the case where the material card is displayed in the material adding area by selecting and adding the material template. In addition to the above implementation, the material card can also be displayed in the material adding area by newly creating a blank template to be edited. The blank template to be edited is created by triggering a template adding control. For example, there is a blank material adding control in the video production interface; and by triggering the blank material adding control, the blank template to be edited can be added to the material adding area. The selected and added material template or the blank template to be edited displayed in the material adding area can be used as the material template that the video producer wants to edit. In this embodiment, the selected and added material template and the newly created blank template in the material adding area are referred to as material cards, and the video producer can make a video based on the material cards in the material adding area. Illustratively, the material cards are displayed in the form of thumbnails.

In this step, after the selected material template is added to the material adding area or a blank template to be edited is newly created to the material adding area, the material card for video production can be displayed in the material adding area. In the existing video production by directly applying material template, the selected material template is presented on the editing track of the video production interface and the video producer can only replace the material content contained in the material template on the editing track; what is different from the existing video production is that, the concept of material card is introduced into the video production interface presented in this embodiment, and the material template is displayed in the material adding area in the form of material card in this embodiment. Before editing the material template, the video producer can be guided to add the material template he/she wants to edit to the material adding area, and the added material template can be displayed in the form of a material card, so that the video producer can select the material template he/she wants to edit by clicking the material card. For example, the material card can be displayed in the form of a thumbnail of the material template, and the material template is presented in the form of a card. The material card is presented in the form of a thumbnail such that the content of the cover of the thumbnail can be any frame of picture in the material template, the sequence number of the material card can be displayed on the thumbnail, and the video length of the material card is displayed below the material card.

It can be understood that one or more material templates can be displayed in the area for displaying the designed and produced material templates. Similarly, the video producer can select one or more material templates and add the same into the material adding area, or create one or more new blank templates to be edited; that is, one or more material cards and/or one or more blank templates to be edited can be displayed in the material adding area. In addition, for the material cards that have been added to the material adding area, the displayed material cards can be deleted by triggering a material deleting control, so that the deleted material cards are no longer displayed in the material adding area.

S102, in response to a selection operation for the material card in the material adding area, displaying, in a card editing area of the video production interface, one or more material elements contained in the selected material card. The material elements in the card editing area have edition authority, and are selected in advance from an element template set or imported from the outside and added in the card editing area.

From the perspective of the video producer, when the video producer wants to use a material card in the material adding area for video production, it can be achieved by a selection operation performed on the material card in the material adding area, and the video producer can perform the selection operation on any material card in the material adding area. For example, the video producer right-clicks an external input device such as a mouse to perform the selection operation. In this step, it can display, in the card editing area, the material elements contained in any material card by selecting the material card in the material adding area. The selected material card can correspond to one card editing area, and the material elements displayed in the card editing area correspond to the material cards one by one. The card editing area can be understood as an editing area provided to video producers for editing the material elements in the material card.

From the perspective of the executive subject, in this step, after the video producer selects any material card in the material adding area, it will display, in the card editing area of the video production interface, one or more material elements included in the selected material card in response to the above-mentioned selection operation for the any material card in the material adding area. Among them, the card editing area is another area in the video production interface that is different from the material adding area. The card editing area is configured to display the material elements contained in the selected material card. Material elements can be understood as the elements contained in the material card. Illustratively, the material elements may include audios, videos, pictures, textures, texts, charts and the like. For example, if the material card has the effect of "snowflake falling", the material content of the material template is "earth picture", the material playback duration is "10 second", and the material contains background music and configured texts, then the effect of snowflake falling, the earth picture, the background music and the texts can all be considered as the material elements contained in the material card.

In the existing video production by directly applying material template, the selected material template is presented on the editing track of the video production interface. What is different from the existing display mode for material template is that in this embodiment, the material template is embodied in the form of a material card. After the material card is selected, the selected material card is displayed, in the card editing area, as a material card to be edited. Unlike the existing technology in which the video producer can only replace the material content contained in the material template on the editing track, in this embodiment, all the material elements of the material card displayed in the card editing area have edition authority. At the same time, it also has the authority to add and edit new material elements to the material card.

The material element in the card editing area has an edition authority. For example, the same edition authority can be provided for the material elements at the beginning of design, or, different editing authorities can be set for different material elements. Since the material elements in the card editing area contain different editing authorities, the video producer can edit different material elements to achieve the desired effect. For example, the material elements can be audios, videos, pictures, textures, texts, charts, etc. The edition of audio type, video type, picture type and texture type can be time adjustment, level adjustment, deletion, transparency adjustment, trimming size, trimming duration, horizontal flipping, vertical flipping, element replacement, animation effect, etc. The edition of text type can include: time adjustment, level adjustment, deletion, text editing items, animation effect and text format adjustment. The edition of chart type can be time adjustment, level adjustment, deletion and data editing items.

In this embodiment, when editing the material card in the card editing area, the video producer can perform an edition of a single type on a certain material element, or perform an edition of multiple types on a certain material element. Of course, it can also perform an edition of a single type on multiple material elements, or it can also perform an edition of multiple types on multiple material elements. In this embodiment, the material elements in the card editing area can be edited according to the edition authority of the material elements based on the requirements of video producers.

It is appreciated that in order to show that all the material elements in the card editing area have edition authority, corresponding editing columns can be set in advance for different types of material elements, and corresponding editing items are displayed in the editing columns. When a video producer wants to edit a certain material element, he/she needs to select the material element firstly, and accordingly, the editing column corresponding to the material element will be displayed. The video producer can edit the material element by operating the editing items on the editing column. Corresponding to the above description, if the same editing items are preset for different types of material elements, when any material element is selected, the same editing items will be presented in the displayed editing column; if different editing items are preset for different types of material elements, when any material element is selected, a corresponding editing column will be displayed, and different material elements correspond to different editing items.

Following the above description, in this embodiment, in addition to the fact that all the material elements in the card editing area having edition authority, the card editing area also has the authority of adding and editing new material elements to the material card. The element template set contains material information of the material. When the material elements contained in the material card can't satisfy the needs of the video producer, the video producer can add the material elements he/she wants to add to the material card by triggering the material adding control. The material elements are selected from the element template set in advance or imported from the outside, and added in the card editing area. Further, the newly added material elements can be displayed in the card editing area. The newly added material elements also have edition authority, and the edition authority of the newly added material elements is related to the element type of the newly added material elements. Among them, the newly added material elements can be audios, videos, pictures, textures, texts, charts, etc., and there are no specific restrictions here. In the card editing area, relevant controls for guiding video producers to add material elements are presented. In this embodiment, it can obtain the material elements selected or imported in the material element adding window after receiving the trigger to the relevant controls.

Different from the existing video production by directly applying material template in which the video producer can only replace the material content contained in the material template on the editing track but cannot edit the material elements and cannot add new material elements, in this embodiment, the concept of card editing area is introduced into the presented video production interface, and the material elements contained in the selected material card can be displayed in the card editing area. The material elements in the card editing area all have edition authority, and also have the authority to add new material elements. The material template provided by this embodiment is displayed in the form of a material card, and the material elements contained in the material card can be displayed in the card editing area and have edition authority, so that the video producer can edit the material card, which better matches the production requirements of the video producer, ensures the flexibility of editing the material template, provides basic support for subsequent effective and diversified video production, and satisfies the individual and personalized requirements of the video producer.

Figure 1B:
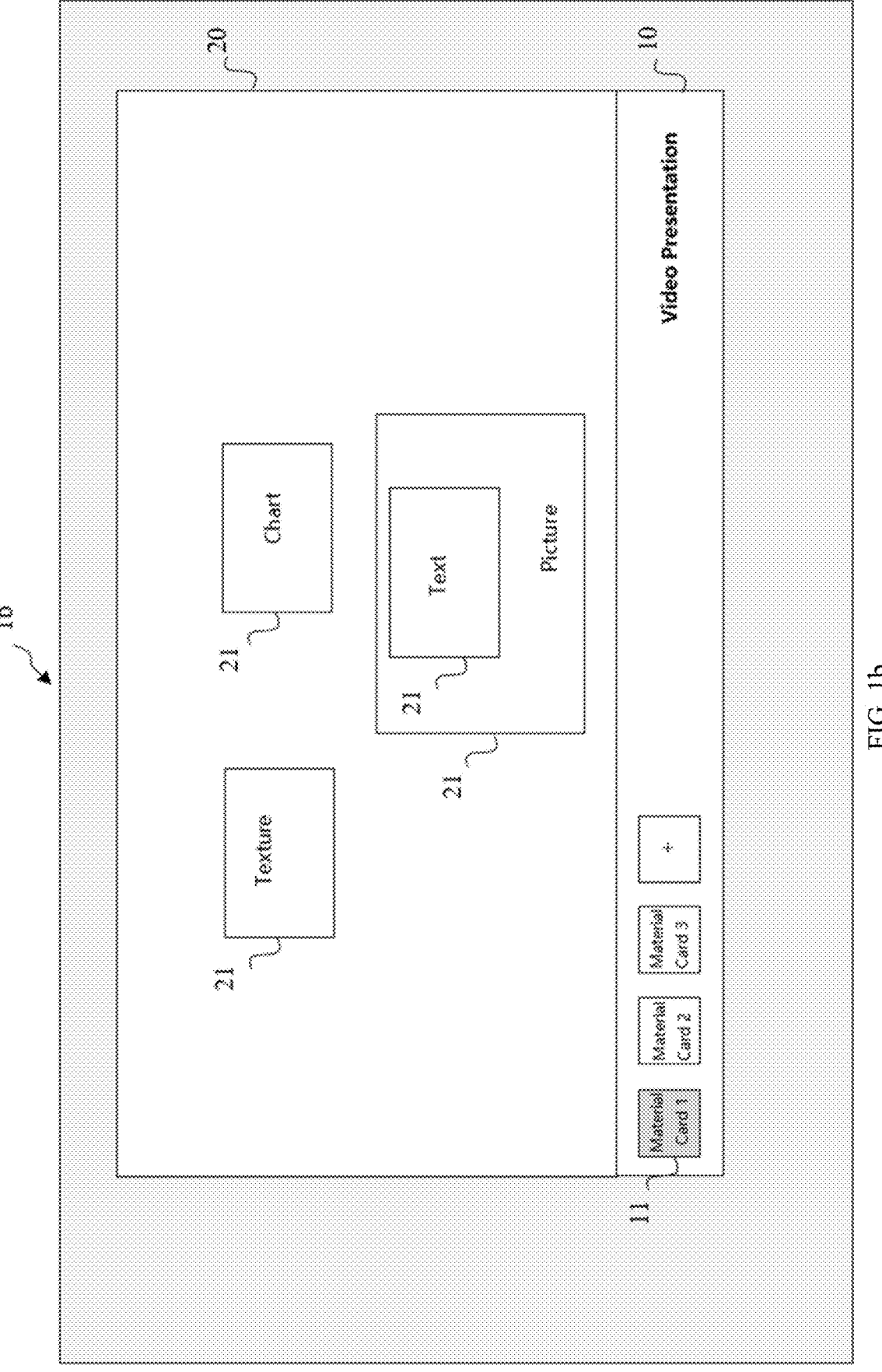
FIG. 1b shows a schematic diagram of a video production interface presenting a material adding area, as displayed in the video production method provided by the embodiment of the present disclosure.

For example, FIG. 1b shows a schematic diagram of the displayed video production interface in the video production method provided by this embodiment, which presents the material adding area. As can be seen from FIG. 1b, a material producing interface 1b includes a material adding area 10 and a card editing area 20. The material adding area 10 contains a material card 11 having been added, which includes a material card 1, a material card 2 and a material card 3. When the material card 1 is selected, all the material elements 21 contained in the material card 1 are displayed in the card editing area 20, and the material elements 21 are a texture, an chart, a text and a picture, respectively. It can be seen that the material template to be edited is presented in the form of a material card. After the material card is selected, the material elements contained in the material card are presented in the card editing area for editing.

S103, in response to a triggered video presentation operation, playing a video content in the video presentation interface. The video content is formed based on at least one material card containing material elements in the material adding area.

It should be noted that the demand that video producers finally want to satisfy in video production can be described as: the video with the desired content effect can be formed by editing the material template, and the composition of video content needs to come from the edited material template. The key to obtaining the video with the desired content effect is that the material template is presented in the form of a material card. By presenting, in the card editing area, the material elements contained in the material card, each material element has edition authority, so that the video formed based on the edited material template can satisfy the individual and personalized requirements of the video producer by editing the material elements.

For example, the video presentation operation can be understood as an operation of video presentation, and the video presentation operation can be a triggering operation on a video presentation control. In this step, when the video producer triggers the video presentation operation, it receives the video presentation operation and executes the corresponding logical response, i.e., forming video content based on one or more material cards containing material elements in the material adding area, and playing the video content in the video presentation interface.

In this embodiment, corresponding options can be set for the video producer to choose material cards in the material adding area, of which the material elements need to be merged so as to realize the personalized configuration of the video producer. For example, the video producer can choose from the following two options: playing from the currently selected card and playing from the first card position. The video producer can select from the two options in a playback mode selection window according to playback requirements. Among them, "playing from the currently selected card" can be considered as merging the current material card with subsequent material cards in the material adding area and playing from the current card; and "playing from the first card position" can be considered as playing the material elements of all the material cards in the material adding area and playing from the first material card.

It should be noted that, unlike the existing video production by directly applying material template which cannot edit the material elements in the material template and can only perform simple content replacement, the material template in the form of material cards provided by this embodiment can be edited by means of the following principle: corresponding protocol adaptation is added when the underlying technology supports, i.e., some adaptive protocols that can be converted into editable material cards are added on the basis of the support of original underlying technology. With the support of the above underlying technology, on the visual level, the protocols are presented as editable material cards, so that video producers can edit the material template, which provides convenience for video production and satisfies the personalized settings of video producers.

The above technical solution of this embodiment is equivalent to providing a simple and easy-to-operate video production platform for video producers. The video production interface of the video to be produced can be presented on the video production platform, and the video production interface can provide the video producers with relevant functions for editing the material template. Different from the existing video production by directly applying material template in which the video producer can only replace the material content contained in the material template on the editing track but cannot edit the material elements and cannot add new material elements, the concept of card editing area is introduced into the video production interface presented in this embodiment, so that the material elements contained in one or more selected material cards can be displayed in the card editing area, and the material elements in the card editing area all have edition authority and also the authority to add new material elements. The material template provided by this embodiment is displayed in the form of material card, and the material elements contained in the material card can be displayed in the card editing area with edition authority, and can also be imported from the outside and added in the card editing area, so that the video producer can edit the material card, which better matches the production requirements of the video producer, ensures the flexibility of editing the material template, provides basic support for subsequent effective and diversified video production, satisfies the personalized setting requirements of the video producer, enriches the video editing forms, and guarantees the flexibility of video production.

As a first alternative embodiment of this embodiment, on the basis of the above embodiment, the method can be further refined after displaying, in the card editing area of the video production interface, the one or more material elements included in the selected material card, including the following steps:

a1) receiving a first selection operation, wherein the first selection operation is a selection of any material element displayed in the card editing area, and the selected material element is referred to as a first selected element.

In the process of displaying, in the card editing area of the video production interface, the material elements included in the selected material card and playing the video content in the video presentation interface, it actually includes editing the material elements displayed in the card editing area. For example, it can be understood that when the material elements included in the selected material card are displayed in the card editing area, the video producer can edit the material elements displayed in the card editing area according to his/her own needs so as to satisfy the individual and personalized requirements of the video producer. Among them, the first selection operation is an editing operation mode. The first selection operation can be understood as the selection of any material element displayed in the card editing area. In this embodiment, the selected material element is referred to as the first selected element.

For example, it assumes that the material elements of a certain material card include audio, video, picture and texture, all of which are displayed in the card editing area. When a video producer wants to edit the displayed picture, he/she can select the picture, which is the first selection operation; and the selected picture is the first selection element.

It can be understood that when the video producer wants to edit some material elements in the material card, he/she can select and edit the material elements in sequence, i.e., selecting one material element, considering the one material element as the first selected element and editing the first selected element, and then selecting another material element, considering the another, selected material element as the first selected element, and editing the first selected element, and so on.

Different from the existing video production by directly applying material template in which it can only replace the material content, in this embodiment, any material element in the card editing area can be selected through the first selection operation so as to further edit the selected material element. It can be seen that in this embodiment, when editing with the material card, any material element in the material card can be selected and edited. When the video producer performs the first selection operation, this step is configured to receive the first selection operation. The video producer's operation is analyzed by the executive subject based on the underlying technical support to analyze that the video producer has performed the first selection operation.

b1) determining and displaying an editing column matched with the element type of the first selected element, wherein the editing column contains at least one editable item.

For example, the editing column can be understood as an editing box that displays editable items. The editing column contains one or more editable items. When the video producer wants to edit the selected material elements, the editable items in the editing column can be triggered to realize the editing operation for the material elements. Considering that the material elements in the card editing area may belong to different element types, different editing operations can be carried out for different element types. Therefore, in this embodiment, the editing columns matched with different element types are preset, and correspondingly, the editable items contained in the editing columns corresponding to different element types can also be different. Among them, the element type of the material element can be audio type, picture type, text type, etc., which are not listed here. For example, for the picture type, the editing operations that can be performed include size trimming, flipping, element replacement, level adjustment, deletion, and so on. For the text type, the editing operations that can be performed include text editing, animation effect, level adjustment, deletion and so on.

In this embodiment, the corresponding relationship between the element types of material elements and their associated editable items can be pre-stored, which is equivalent to pre-setting the corresponding relationship between the element types of different material elements and their associated editing columns. After receiving the first selection operation, the executive subject analyzes the first selected element selected by the first selection operation, determines the editing column matched with the element type of the first selected element by querying the pre-stored, corresponding relationship between the element type and its associated editing column, and displays the editing column. Among them, the display position and specific shape of the editing column are not particularly limited. For example, the editing column can be displayed, in the form of a rectangular box, at the top of the card editing area, and the editable items matching the element type are displayed in the editing column.

In this embodiment, when the video producer performs the first selection operation for different material elements, the matching editing columns will be displayed while different types of material elements being selected. It can be considered that when different types of material elements are selected, the editable items displayed on the editing column are different.

In some examples, the element types of the material elements include at least one of the following: audio type, video type, picture type, texture type, text type and chart type.

The editable items in the editing columns corresponding to different element types each include: time adjustment item, level adjustment item and deletion item.

The editable items in the editing columns corresponding to the audio type, video type, picture type and texture type also include one or more of transparency, trimming size, trimming duration, horizontal flipping, vertical flipping, element replacement and animation effect.

The editable items in the editing column corresponding to the text type also include at least one of the following: text editing item, animation effect and at least one adjustment item for text format adjustment.

The editable items in the editing column corresponding to the chart type also include data editing item of the chart.

For example, the above adjustments all can be made for the material elements contained in the material card. The time adjustment item can be understood as adjusting the starting and stopping playback times of the material element; the level adjustment item can be understood as adjusting the display level of the material element; the deletion item can be understood as deleting the material element; the transparency can be understood as adjusting the display transparency of the material element; the trimming size can be understood as adjusting the size of the material element; the trimming duration can be understood as trimming the time duration of the material element; the horizontal flipping and vertical flipping can be understood as adjusting the display mode of the material element; the element replacement can be understood as replacing the material element; the animation effect can be understood as adjusting the display effect of the material element; the text editing can be understood as editing text content; and the data edition of chart can be understood as editing data in the chart.

It can be seen that the time adjustment item, the level adjustment item and deletion item are all editable items included in each of the above-mentioned element types, while other editable items are different for different element types.

For example, FIG. 2a shows a schematic diagram of the editing column presented in the displayed video production interface in the video production method provided by this embodiment. As can be seen from FIG. 2a, in the card editing area 20 included in the video production interface 2a, after the material element 21 (text) is selected, an editing column 22 corresponding to the text appears on the card editing area 20, and the editing column 22 includes text editing function item, animation effect function item, text format adjustment function item, time adjustment function item, level adjustment function item and deletion item. The video producer can edit the material element 21 by triggering the function items.

According to the technical solution of this embodiment, the element types of material elements and the editable items corresponding to different element types are refined, and different editing operations can be performed on different types of material elements by setting the editable items corresponding to different element types, which enriches the editing contents of material elements, provides basic support for individual and personalized requirements of video production, and enables video production to be easily operatable and more flexible.

c1) adjusting a related element attribute of the first selected element in the material card according to editing information edited for the first selected element in the editing column.

In this embodiment, after the editing column matching the element type of the first selected element is determined and displayed, the video producer can edit the first selected element in the video column, and the editing information of the first selected element will be formed when the video producer edits the first selected element in the video column. It is appreciated that by editing the first selected element in the editing column, the attributes of related elements in the material card will be changed; and it can also be considered that the material elements displayed in the card editing area will also be changed accordingly. No matter which material element is selected for editing, the corresponding attribute of the material element can be adjusted. In this step, it can receive the editing operation on the first selected element in the editing column and perform a response of related execution logic. For example, in response to the editing operation on the first selected element in the editing column, analyzing editing information of the first selected element so as to adjust the related element attributes of the first selected element in the material card based on the editing information.

For example, assuming that the first selected element is a picture, the editable items in the displayed editing column include transparency, trimming size, trimming duration, horizontal flipping, vertical flipping, element replacement, animation effect, time adjustment item, level adjustment item and deletion item. When the video producer wants to adjust the transparency of the picture, the editable item of transparency in the editing column can be edited, for example, by dragging a transparency progress bar, to form corresponding editing information. At the same time, when the transparency of the picture is adjusted, the transparency of the picture displayed in the card editing area will be changed accordingly. Alternatively, if the first selected element is text, the editable items in the displayed editing column include text editing item, animation effect, at least one adjustment item for text format adjustment, time adjustment item, level adjustment item and deletion item. When the video producer wants to adjust the animation effect of the text, he/she can edit the editable item of text effect in the editing column, for example, the effect of "dynamic text" can be selected in the text effect to realize the edition of the text effect, thus forming the corresponding editing information. At the same time, when the text effect of the text is adjusted, the text effect of the text displayed in the card editing area will be changed accordingly.

In this embodiment, by editing the selected elements in the editing column, the video producer can edit each material element in the material template according to his/her own needs. Different from the existing video production by directly applying material template in which only the content can be replaced, in this embodiment, the video producer can edit various types of material elements in the material template based on the editing column in the card editing area, so as to satisfy the production requirements of the video producer and to make up for the defects in the existing video production by directly applying material template that only the content can be replaced and the material elements cannot be edited.

According to the technical solution of this embodiment, after the material elements included in the selected material card are displayed in the card editing area of the video production interface, the material elements in the card editing area can be edited, and the video producer can realize various types of editions of various material elements by providing editable items in the editing columns of the material elements, which is not limited to the simple operation of content replacement. Video production platform provides video producers with various editing functions for material elements, which better ensures the edition of material templates according to the needs of producers, realizes the diversification of material template editing and satisfies the individual and personalized requirements of video producers.

In this embodiment, there are many ways to edit the first selected element in the editing column, among which time adjustment item, level adjustment item and deletion item can be understood as editable items included in each of the editing columns corresponding to different element types. Among them, time adjustment can be used as an editing method for the first selected element.

On the basis of the above-mentioned first alternative embodiment, the editing information edited for the first selected element in the editing column can be further optimized, and the related element attributes of the first selected element in the material card can be adjusted for further refinement, including the following steps, for example:

c11) in response to a triggering operation for the time adjustment item in the editing column, obtaining element starting and stopping playback information edited in a presented time adjustment window.

In the existing editor, the playback duration of the designed material template is fixed, and if a material content beyond the playback duration is used for replacement, the playback duration cannot be flexibly adjusted, and the playback duration of the material template cannot be adjusted.

In this embodiment, when the video producer wants to adjust the playback time of the first selected element, he/she can trigger the time adjustment item in the editing column displayed corresponding to the first selected element. The triggering operation for the time adjustment item can be carried out by clicking the time adjustment item to make it present a time adjustment window for setting the starting and stopping playback times, and the video producer can edit the starting and stopping playback times in the time adjustment window to set the desirable playback duration of the first selected element.

In this step, it can receive the editing operation for the time adjustment item in the editing column and respond to the execution logic. For example, it can present the time adjustment window in response to the editing operation for the first selected element, and obtain the element starting and stopping playback information edited in the time adjustment window. By way of example, assuming that the original playback duration of the first selected element is 12 seconds, the starting playback time is 0 second and the stopping playback time is 12 seconds; if the video producer wants to adjust the starting and stopping playback times of the first selected element, he/she can set the starting playback time of the first selected element as 2 seconds and set the stopping playback time as 10 second. This adjustment operation can be regarded as a triggering operation for the time adjustment item. Accordingly, this step is configured to obtain the element starting and stopping playback information edited in the presented time adjustment window, in response to the triggering operation for the time adjustment item in the editing column.

c12) adjusting a first related element attribute of the first selected element in the material card according to the element starting and stopping playback information, wherein the first related element attribute includes the element starting and stopping playback times. Among them, the playback duration formed by the element starting and stopping playback times is less than or equal to the card playback duration of the material card.

In the following, the above steps are described in more details. After obtaining the element starting and stopping playback information edited in the presented time adjustment window through the above steps, it is necessary to adjust the corresponding attributes of the first selected element according to the edited information. In this embodiment, the attribute for time adjustment of the first selected element is referred to as the first related element attribute, which can be understood as the element starting and stopping playback times, for example. By way of example, the first related element attribute of the first selected element in the material card is adjusted according to the element starting and stopping playback information.

It should be noted that, when the element starting and stopping playback times are adjusted, the material element, as a constituent element of the material card, should be ensured that the element playback duration formed by the starting and stopping playback times is less than or equal to the card playback duration of the material card.

By way of example, FIG. 2b shows a schematic diagram of time adjustment based on the editing column presented in the displayed video production interface in the video production method provided by this embodiment. As can be seen from FIG. 2b, in the card editing area 20 included in the video production interface 2b, after the material element 21 (text) is selected, an editing column 22 corresponding to the text is presented on the card editing area 20. When the video producer triggers the time adjustment function item, a time adjustment window 221 can be presented, and the video producer can edit the starting and stopping playback times of the text in the time adjustment window 221.

The above technical solution provides more details regarding how to adjust the related attributes of the selected element in the material card based on the editing information of the selected element when adjusting the playback time of the selected element. Different from the existing video production by directly applying material template which only allows for content replacement but does not allow for time adjustment of the material elements in the material template, the technical solution of the present disclosure realizes the adjustment of the starting and stopping playback times of the material elements in the material cards by adjusting the time adjustment item in the editing column, provides the video producer with the function of adjusting the starting and stopping playback times of each material element in the material card, and provides convenience for the individual and personalized requirements of the video producer.

In an example, level adjustment can be used as another editing method for the first selected element. On the basis of the above-mentioned first alternative embodiment, it can be further optimized such that adjusting the related element attributes of the first selected element in the material card by editing the editing information of the first selected element in the editing column may include the following steps:

c111) in response to the triggering operation for the level adjustment item in the editing column, acquiring the level adjustment information of the selected element in the displayed level adjustment window.

In this embodiment, when the video producer wants to adjust the level of the first selected element, he/she can trigger the level adjustment item in the editing column displayed corresponding to the first selected element. The triggering operation for the level adjustment item may be clicking the level adjustment item to present the level adjustment window, and the video producer selects the corresponding level option in the level adjustment window to set the desirable presentation level of the first selected element. After the video producer performs the level adjustment in the level adjustment window, the element level adjustment information of the corresponding selected element will be formed. For example, when the video producer clicks the level adjustment item, the level options can be presented, such as moving upwards by one level, moving downwards by one level, setting to the top and setting to the bottom, and the video producer can realize the level adjustment of the first selected element by selecting one of these options.

In this step, it can receive the editing operation for the level adjustment item in the editing column and respond to the execution logic. For example, in response to the triggering operation for the level adjustment item in the editing column, the level adjustment information of the selected element in the presented level adjustment window can be obtained. By way of example, assuming that the display level of the first selected element is a second level and the video producer wants to adjust the display level of the first selected element to the first level, he/she can trigger the level adjustment item to present the level adjustment window, and select "moving upwards by one level" in the level adjustment window, which is equivalent to completing the adjustment of the display level of the first selected element. Accordingly, this step is configured to obtain the level adjustment information of the selected element in the displayed level adjustment window in response to the triggering operation for the level adjustment item in the editing column.

c112) adjusting a second related element attribute of the first selected element in the material card according to the element level adjustment information, wherein the second related element attribute is the element display level.

In the following, the above steps are described in more details. After obtaining the level adjustment information of the selected element in the displayed level adjustment window, it is necessary to adjust the corresponding attribute of the first selected element according to the edited information. In this embodiment, the attribute of the level adjustment of the first selected element is referred to as the second related element attribute, which can be understood as the element display level. By way of example, the second related element attribute of the first selected element in the material card is adjusted according to the element level adjustment information.

For example, FIG. 2c shows a schematic diagram of level adjustment based on the editing column presented in the displayed video production interface in the video production method provided by this embodiment. As can be seen from FIG. 2c, in the card editing area 20 included in the video production interface 2c, after the material element 21 (text) is selected, an editing column 22 corresponding to the text is presented on the card editing area 20. When the video producer triggers the level adjustment function item, a level adjustment window 222 can be presented. For example, the level adjustment window includes options such as moving upwards by one level, moving downwards by one level, setting to the top and setting to the bottom, and the video producer can realize the level adjustment of the text by selecting one of these options.

The above technical solution provides more details regarding how to adjust the related attributes of the selected element in the material card based on the editing information of the selected element when adjusting the display level of the selected element. Different from the existing video production by directly applying material template which only allows for content replacement but does not allow for level adjustment of the material elements in the material template, the technical solution of the present disclosure realizes the adjustment of display levels of the material elements in the material cards by adjusting the level adjustment item in the editing column, provides the video producer with the function of adjusting the display level of each material element in the material card, and provides convenience for the individual and personalized requirements of the video producer.

In another example, deletion can be used as another editing method for the first selected element. On the basis of the above-mentioned first alternative embodiment, the editing information edited for the first selected element in the editing column can be further optimized such that the related element attributes of the first selected element in the material card can be adjusted for further refinement, including the following steps:

In response to the triggering operation for the deletion item in the editing column, removing the first selected element from the material card, and deleting the attribute information of related element attributes corresponding to the first selected element.

In this embodiment, when the video producer wants to delete the first selected element, he/she can trigger the deletion item in the editing column displayed corresponding to the first selected element. The triggering operation for the deletion item can be clicking the deletion item to delete the selected material element. For example, assuming that the material elements of a material card include audio, video, picture and texture, which are all displayed in the card editing area; when the video producer wants to delete the displayed texture, he/she can select the texture and trigger the deletion item in the editing column to delete the texture.

The above technical solution provides more details regarding how to adjust the related attributes of the selected element in the material card based on the editing information of the selected element when deleting the selected element. Different from the existing video production by directly applying material template which only allows for content replacement but does not allow for deletion of the material elements in the material template, the technical solution of the present disclosure realizes the deletion of the material elements in the material cards by triggering the deletion item in the editing column, provides the video producer with the function of deleting each material element in the material card, and provides convenience for the individual and personalized requirements of the video producer.

As a second alternative embodiment of this embodiment, on the basis of the above embodiment, the method can be further refined after receiving the first selection operation, including the following steps:

a2) in response to a first dragging event for the first selected element, adjusting a display position of the first selected element in the material card by following a cursor movement position of the first dragging event.

The above description introduces the related operations edited for the first selected element. In addition to editing the first selected element, it is described in this alternative embodiment that the first selection operation can also be a dragging operation, which is referred to as the first dragging event in this embodiment. The first dragging event for the first selected element can be understood as dragging the first selected element to move, for example. The video producer controls the mouse to drag the first selected element to move so as to reach the desirable position. For example, if the video producer selects the texture in the card editing area, the texture is the first selected element, and moving the texture from the current position to another position can be referred to as the first dragging event for the first selected element.

In this step, it can receive the first dragging event for the first selected element and respond to the related execution logic. For example, when the first dragging event for the first selected element is received, the display position of the first selected element in the material card can be adjusted according to the cursor movement position of the first dragging event.

By way of example, FIG. 2d shows a schematic diagram of dragging material elements based on the card editing area presented in the displayed video production interface in the video production method provided by this embodiment. As can be seen from FIG. 2d, in the card editing area 20 included in the video production interface 2d, after the material element 21 (chart) is selected, dragging the chart along the dotted line direction with the mouse can be considered as the first dragging event.

Accordingly, in the video production method provided by this embodiment, FIG. 2c shows a representation example after the position of the material element is moved based on the card editing area presented in the displayed video production interface. As can be seen from FIG. 2e, in the card editing area 20 included in the video production interface 2e, after the material element 21 (chart) is selected, the chart will follow the cursor movement of the first dragging event and reach the last position of the dragged cursor.

b2) in response to a first selected movement event on any side or corner of a selected frame presented by the first selected element, adjusting a display size of the first selected element in the material card by following the cursor movement position of the first selected movement event.

In addition to the operations described above, the size of the first selected element can also be adjusted. In this alternative embodiment, the operation of size adjustment of the first selected element is referred to as the first selected movement event. Among them, the first selected movement event for the first selected element can be understood as selecting and moving any side or any corner on the selected frame presented by the first selected element. The video producer selects and drags any side or corner of the frame presented by the first selected element, by controlling the mouse, to obtain the desirable size. For example, if the video producer selects the texture in the card editing area, the texture is the first selected element, and dragging any side or corner of the selected frame presented by the texture from the current position to another position can be referred to as the first selected movement event for the first selected element.

In this step, it can receive the first selected movement event for the first selected element and respond to the related execution logic. For example, when the first selected movement event for the first selected element is received, the display size of the first selected element in the material card can be adjusted according to the cursor movement position of the first selected movement event.

For example, FIG. 2f shows an example of size adjustment of the material elements based on the card editing area presented in the displayed video production interface in the video production method provided by this embodiment. As can be seen from FIG. 2f, in the card editing area 20 included in the video production interface 2f, after one side of the frame of the material element 21 (chart) is selected, this side of the selected frame is moved along the dotted line direction by dragging the chart with the mouse, which can be considered as the first selected movement event.

Accordingly, FIG. 2g shows a representation example of the video production method provided by this embodiment after the size adjustment of the material elements based on the card editing area presented in the displayed video production interface. It can be seen from FIG. 2g that in the card editing area 20 included in the video production interface 2g, after one side of the frame of the material element 21 (chart) is selected, this side of the selected frame is moved along the dotted line direction by dragging the chart with the mouse, and this side of the chart will follow the cursor movement of the first selected movement event to reach the last position of the dragged cursor, thus realizing the size adjustment of the chart.

The above technical solution of this embodiment adds the functions of moving the display position and adjusting the size of a certain material element in the material card. By dragging the selected element or moving the side or corner of the selected frame presented by the selected element, the display position of the material element in the material card can be moved and the display size of the material element can be adjusted. Different from the existing video production by directly applying material template which only allows for content replacement but does not allow for adjustment of the display position and the display size of the material elements in the material template, the technical solution of the present disclosure realizes the adjustment of the display position and display size of the material elements in the material card through the dragging event or the selected movement event for the material elements, provides the video producer with the function of adjusting the display position and display size of each material element in the material card, and provides convenience for the individual and personalized requirements of the video producer.

As a second alternative embodiment of this embodiment, on the basis of the above embodiment, the method can be further refined after the one or more material elements included in the selected material card are displayed in the card editing area of the video production interface, including the following steps:

a3) receiving a second selection operation, wherein the second selection operation is a selection of at least two material elements displayed in the card editing area, and the selected material elements are referred to as a second selected element.

In the process of displaying, in the card editing area of the video production interface, the card elements included in the selected material card and playing the video content in the video presentation interface, it actually includes editing the card elements displayed in the card editing area. For example, it can be understood that when the material elements included in the selected material card are displayed in the card editing area, the video producer can edit the material elements displayed in the card editing area according to his/her own needs to satisfy the individual and personalized requirements of the video producer. The second selection operation is another editing operation mode. The second selection operation is to be distinguished from the first selection operation. In this embodiment, the selection of at least two material elements displayed in the card editing area is referred to as the second selection operation. The material elements selected by the second selection operation are referred to as the second selected element.

It can be understood that when a video producer wants to edit some material elements in a material card in the same way, he/she can select all the material elements he/she wants to edit, and then edit these selected material elements together. For example, assuming that the material elements of a material card include audio, video, picture and texture, which are all displayed in the card editing area; when a video producer wants to edit these displayed material elements, he/she can select the video, picture and texture; the selection of the video, picture and texture is just the second selection operation, and the selected video, picture and texture are the second selection elements.

Different from the existing video production by directly applying material template which only allows for content replacement but does not allow for selection of one or more material elements, in this embodiment, any number of material elements in the card editing area can be selected through the second selection operation so as to further edit the selected material elements. It can be seen that in this embodiment, when editing with the material card, any number of material elements in the material card can be selected, and also any number of selected material elements can be edited. When the video producer needs to perform the same operation on several material elements at the same time, he/she can perform the second selection operation, and this step is configured to receive the second selection operation. When the executive subject receives the second selection operation, it can analyze the operation of the video producer based on the underlying technical support to analyze that the video producer has performed the second selection operation.

b3) in response to a second dragging event for the second selected element, adjusting a display position of the second selected element in the material card by following a cursor movement position of the second dragging event.

In this step, when the second selected element is selected, that is, when two or more material elements are selected, it can perform a dragging operation for the second selected element, which is referred to as the second dragging event in this embodiment. For example, the second dragging event for the second selected element can be understood as dragging the second selected element to move. The video producer controls the mouse to drag the second selected element to move, so as to reach the desirable position. For example, if a video producer selects a texture and a picture in the card editing area, the texture and the picture are referred to as the second selected element, and moving the texture and the picture from the current position to another position can be referred to as a second dragging event for the second selected element. It can be understood that when the second dragging event is performed on the second selected element, various elements in the second selected element have the same displacement.

In this step, it can receive the second dragging event for the second selected element and respond to the related execution logic. For example, when the second dragging event for the second selected element is received, the display position of the second selected element in the material card can be adjusted according to the cursor movement position of the second dragging event.

c3) in response to a second selected movement event on any side or corner of a selected frame presented by the second selected element, a display size of the second selected element in the material card is adjusted by following a cursor movement position of the second selected movement event.

In addition to the operations described above, a size adjustment can also be performed on the second selected element, which is equivalent to adjusting the sizes of several selected elements at the same time. In this alternative embodiment, the operation of adjusting the size of the second selected element is referred to as the second selected movement event. For example, the second selected movement event for the second selected element can be understood as selecting and moving any side or any corner on the selected frame presented by the second selected element. The video producer selects and drags any side or corner of the frame presented by the second selected element by controlling the mouse, so as to obtain the desirable size. For example, if the video producer selects a texture and a picture in the card editing area, the texture and the picture are referred to as the second selected element, and dragging any side or corner of the selected frame presented by the texture and the picture from the current position to another position can be referred to as the second selected movement event for the second selected element. It can be understood that when the second dragging event is performed on the second selected element, various elements in the second selected element have the same size change ratio.

In this step, it can receive the second selected movement event for the second selected element and respond to the related execution logic. For example, when a second selected movement event for a second selected element is received, the display size of the second selected element in the material card can be adjusted according to the cursor movement position of the second selected movement event.

The above technical solution of this embodiment adds the functions of moving the display positions and adjusting the sizes of multiple material elements in the material card at the same time. By dragging the selected elements, or by selecting and moving the sides or corners of the selected frames presented by the selected elements, the display positions and display sizes of multiple material elements in the material card can be adjusted at the same time. Different from the existing video production by directly applying material template which only allows for content replacement but does not allow for adjustment of display positions and display sizes of the material elements in the material template, the technical solution of the present disclosure realizes the adjustment of the display positions and display sizes of a plurality of material elements in the material card at the same time through dragging events or selected movement events, provides the video producer with the functions of simultaneously adjusting the display positions and display sizes of a plurality of material elements in the material card, provides convenience for the individual and personalized requirements of the video producer, and increases the diversity of material edition.

As a second alternative embodiment of this embodiment, on the basis of the above embodiment, it can be optimized that the video production interface also includes a material production navigation column.

The material production navigation column includes at least one of the following function items for material production: video function item, picture function item, text function item, texture function item, background music function item, sound effect function item and chart function.

The function view boxes corresponding to different function items respectively contain the material information of at least one material and an element import control for external import.

In the foregoing, operations of editing the material elements already contained in the material card are described. In this alternative embodiment, the function of adding material elements is additionally provided. That is, when the material elements contained in the material card cannot satisfy the needs of video producers, the material elements can be added as needed. In this embodiment, in addition to the material adding area and the card editing area, a material production navigation column is also introduced into the video production interface, and the function of adding material elements can be realized through the material production navigation column.

Among them, since the material elements can be videos, pictures, texts, textures, background music, sound effects, charts, etc., in order to add various material elements, corresponding function items are set in the material production navigation column. These function items can include video function item, picture function item, text function item, texture function item, background music function item, sound function item and chart function item for adding corresponding types of material elements.

In this embodiment, the material information may be a material thumbnail of the added material, that is, the material is presented in the form of a material thumbnail. An element import control can be a control configured to be triggered to import an element. Different function items can be presented in the form of function view boxes, and each function view box contains material information of at least one material and an element import control for external import.

For example, FIG. 3 shows a schematic diagram of the material production navigation column presented in the displayed video production interface in the video production method provided by this embodiment. As can be seen from FIG. 3, the material production navigation column 30 included in the video production interface 3 includes at least one of the following function items for material production: video function item, picture function item, text function item, texture function item, background music function item, sound effect function item and chart function item. When the video producer wants to add a new picture of the material element to the material card to be edited, he/she can select "Picture" in the material production navigation column 30, and then "Picture Library", "My Picture" and "Import Button" will be displayed in the function view box 31, and the video producer can select the picture of the corresponding type according to the requirements. As shown in FIG. 3, if the "Picture Library" is selected, picture 1, picture 2 and picture 3 under the category of "Picture Library" can be displayed for the video producer to choose.

According to the technical solution in this embodiment, the video production interface also includes a material production navigation column, so that the function of adding material elements is additionally provided. Different from the existing video production by directly applying material template which only allows for content replacement and does not allow for adding additional material elements to the material card, the technical solution of the present disclosure realizes the adding operation for the corresponding type of material elements by triggering the function items for material production in the material production navigation column, which provides convenience for the individual and personalized requirements of video producers and increases the diversity of material edition.

On the basis of the above-mentioned second alternative embodiment, after displaying, in the card editing area of the video production interface, one or more material elements included in the selected material card, the method can be further optimized to include the following steps:

a3) in response to a triggering operation for any function item in the material production navigation column, displaying a corresponding function view box, wherein the function view box contains an element template set and an external import control.

In this embodiment, when a video producer wants to add material elements to a material card, any function item in the material production navigation column can be triggered after the material elements included in the selected material card are displayed in the card editing area of the video production interface. The triggering operation for any function item in the material production navigation column can be selecting the function item to be added by controlling the mouse.

In this step, it can receive a response to the triggering operation for any function item in the material production navigation column. For example, in response to the triggering operation for any function item in the material production navigation column, a function view box corresponding to the function item can be displayed, in which an element template set and an external import control are displayed, the element template set contains the material information of the material, and the external import control is an element import control for external import. The material information displayed in the function view box can be a designed and produced material, which can be a material of the video production platform. It can be considered that the material of the video production platform was set by the developer when the video production platform was developed, and this kind of material can be included under the category of "Material Library". This material can also be a material saved by the video producer after editing by himself/herself, and this kind of material can be included under the category of "My Material". The material can also be imported from the outside. For example, if the video producer wants to add a texture to the material card, he/she can trigger the texture function item in the material production navigation column, and the function view box corresponding to the texture function item will be displayed in the video production interface accordingly. The function view box contains an element template set of thumbnails of pictures and an external import control.

b3) acquiring target material information of a target material selected from the presented element template set or imported through the external import control.

Following the above description, when the corresponding function view box is displayed, the video producer can select from the element template set presented in the function view box or import the material from the outside. This step is configured to obtain the material information of the material selected or imported through the presented function view box. In this embodiment, the material selected or imported through the presented function view box is referred to as the target material, and its corresponding material information is referred to as the target material information.

c3) forming a material element from the target material information and adding the material element to the material card.

For example, obtaining the target material information through the above steps, and adding the material element formed from the target material information into the material card. Accordingly, the material element will also be displayed in the card editing area.

In the technical solution of this embodiment, after the material elements included in the selected material card are displayed in the card editing area of the video production interface, the function of adding new material elements to the material card is additionally provided. By triggering any function item in the material production navigation column, the corresponding function view box is displayed, and new material elements are added to the material card based on the material information of the material selected or imported through the function view box. Different from the existing video production by directly applying material template which only allows for content replacement and does not allow for adding additional material elements to the material card, the technical solution of the present disclosure realizes the adding operation for the corresponding type of material elements by triggering the function items for material production in the material production navigation column, realizes the addition of the material elements, provides convenience for the individual and personalized requirements of video producers, and increases the diversity of material edition.

As a third alternative embodiment of this embodiment, on the basis of the above embodiment, the card editing area can be optimized to include a playback progress bar relative to the material card and a progress adjustment control presented on the playback progress bar, and/or, to include a card duration adjustment item relative to the material card.

This embodiment further defines that the card editing area also contains the playback progress bar of the material card and the progress adjustment control presented on the playback progress bar. In the card editing area, the playback progress bar and the progress adjustment control are added. Based on the adjustment of the progress adjustment control, the playback progress of the material card can be adjusted.

In an example, the method further includes:

a4) in response to a third dragging event for the progress adjustment control, adjusting a material content presented in the card editing area of the material card by following a cursor movement position of the third dragging event.

In this alternative embodiment, the dragging of the progress adjustment control is referred to as the third dragging event. The third dragging event for the progress adjustment control can be understood as dragging the progress adjustment control to move. The video producer controls a mouse to drag the progress adjustment control to move, so as to reach the content that the video producer wants to play.

By way of example, FIG. 4 shows a schematic diagram of the progress bar in the card editing area presented in the video production interface displayed in the video production method provided by this embodiment. As can be seen from FIG. 4, the card editing area 20 included in the video production interface 4 includes a progress bar 23, and the progress adjustment control presented on the progress bar 23 can be dragged by the mouse for adjustment.

In this step, it can receive the third dragging event for the progress adjustment control and respond to the related execution logic. For example, when the third dragging event for the progress adjustment control is received, the material content presented in the card editing area of the material card can be adjusted according to the cursor movement position of the third dragging event.

In the technical solution of this embodiment, the function of adjusting the playback progress of the material card is added. By adjusting the progress adjustment control, the material content presented in the card editing area of the material card can be played as required.

b4) in response to a triggering operation for a card duration adjustment item, acquiring card starting and stopping playback information edited in a presented card duration adjustment window, and adjusting a card playback duration of the material card according to the card starting and stopping playback information.

This embodiment further defines that the card editing area also contains a card duration adjustment item relative to the material card. In the card editing area, the card duration adjustment item relative to the material card is added, and the adjustment of playback progress of the material card can be adjusted based on the adjustment of the card duration adjustment item relative to the material card.

In this alternative embodiment, the video producer can also trigger the card duration adjustment item, and when the executive subject receives the triggering operation for the card duration adjustment item, a card duration adjustment window can be presented through underlying analysis. The card duration adjustment window can contain filling boxes corresponding to the starting and stopping playback times of the card. For example, triggering the card duration adjustment item can be understood as adjusting the starting and stopping playback times in the presented card duration adjustment window. The video producer edits the starting and stopping playback times of the card through an external input device to reach a time period that the video producer wants to play. In this step, it can receive the triggering operation for the card duration adjustment item and respond to the related execution logic. For example, the card starting and stopping playback information edited in the presented card duration adjustment window is obtained.

Adjusting the card playback duration of the material card according to the card starting and stopping playback information. For example, the card playback duration of the material card is adjusted according to the card starting and stopping playback information. For example, assuming that the original playback duration of the card is 20 seconds, the starting playback time is 0 second, and the stopping playback time is 20 second; if the video producer wants to adjust the starting and stopping playback times of the card, he/she can set the starting playback time of the card to 5 seconds and set the stopping playback time to 15 seconds, which is equivalent to adjusting the card playback duration of the material card.

The above technical solution of this embodiment adds the function of adjusting the card playback duration, and the card playback duration of the material card can be adjusted as needed by adjusting the card duration adjustment item.

In an example, after adjusting the card playback duration of the material card according to the card starting and stopping playback information, it further includes:

According to the adjusted, target card playback duration, adjusting the starting and stopping playback times of the material element included in the material card to obtain the target element starting and stopping times.

In this embodiment, after the card playback duration of the material card is adjusted according to the card starting and stopping playback information, the starting and stopping time of the material element will be adjusted accordingly. In this embodiment, the adjusted playback duration of the card is referred to as the target card playback duration. For example, according to the adjusted, target card playback duration, the starting and stopping playback times of the material element included in the material card are adjusted, and the element starting and stopping playback times as obtained are referred to as the target element starting and stopping times. It is clear that the adjusted, target element starting and stopping times constitute a target playback duration less than or equal to the target card playback duration.

In the technical solution of this embodiment, after the card playback duration of the material card is adjusted, the starting and stopping playback times of the material element included in the material card will be adjusted accordingly, so that the automatic adjustment of the starting and stopping playback times of the material element is realized. Different from the existing video production by directly applying material template in which the starting and stopping playback times of the material elements cannot be adjusted according to the starting and stopping playback times of the material card, the above technical solution realizes the automatic adjustment of the starting and stopping playback times of the material elements according to the starting and stopping playback times of the material card, which provides convenience for video production.

In an example, according to the adjusted, target card playback duration, adjusting the starting and stopping playback times of the material elements included in the material card, which can be further optimized to include the following steps:

a5) if the target card playback duration is shorter than the card playback duration before adjustment, the starting and stopping playback times of the material elements included in the material card are shortened for adjustment according to a preset shortening ratio.

Among them, the preset shortening ratio can be set according to the actual situation. For example, if the target card playback duration is less than the card playback duration before adjustment, the starting and stopping playback times of the material elements included in the material card will be shortened for adjustment according to the preset shortening ratio.

b5) if the target card playback duration is longer than the card playback duration before adjustment, the starting and stopping playback times of the material elements included in the material card are prolonged for adjustment according to a preset prolonging ratio.

Among them, the preset prolonging ratio can be set according to the actual situation. For example, if the target card playback duration is longer than the card playback duration before adjustment, the starting and stopping playback times of the material elements included in the material card will be prolonged for adjustment according to the preset prolonging ratio.

It should be noted that the following strategies can be adopted for pictures, texts, videos, etc. If the duration is increased by 2 seconds compared with that before adjustment, the playback duration of all the material elements in the card should be prolonged by 2 seconds; if the duration is reduced by 2 seconds compared with that before adjustment, all the material elements in the card should be cut for 2 seconds. If this adjustment mode is adopted, some extreme situations need to be considered, such as whether there are potential problems in dubbing or background music following this adjustment mode, and how to define the boundary value of the time interval for adjustment. First of all, the duration of the background segment is equal to the duration of the card, so the background segment can be understood as a material element with a duration that fills the whole card. From the perspective of adjustment strategy, the background segment can adopt this adjustment strategy on the premise of satisfying the adjustable time interval of the card.

However, the case is different for dubbing segments. Dubbing segments cannot be prolonged by framing, which means that if the duration of the card is increased, it is impossible to prolong the duration of dubbing, because it is necessary to formulate the strategy of the maximum time and the minimum time that the card can be adjusted. For the maximum time that the card can be adjusted, the duration of the card should be increased. What needs to be considered is the dubbing element. At this time, the duration of the dubbing element should not be increased, so that it can keep its original duration. The remaining non-dubbing elements are increased according to the increment of the card duration, except that the card duration needs to be defined with a maximum value, and it is impossible for the card duration to increase endlessly. For example, it is set as 300 seconds. For the minimum time that the card can be adjusted, when the card duration is shortened, the elements in the card will be reduced according to the shortening of the card duration, and the minimum card duration is agreed to be 1 second. However, at this time, there is a situation where a 5-second card contains a text element, which appears from the $2^{th}$ second of the card and lasts until the end of the card for 3 seconds. If the card duration is always shortened to 1 second, the duration of the text segment will be reduced to a negative number according to the above-mentioned adjustment method. Therefore, it is necessary to add a guaranteed strategy.

Following the above description, when the element duration is reduced to 1 second, the shortening of card duration will not reduce the element duration, but will reduce the element starting time. Taking the above-mentioned text element as an example, when the card duration is shortened to 3 seconds, the text fragment has been reduced to 1 second; at this time, shortening the card duration will change the starting time of this text element. When the card duration is shortened by 2 seconds, the starting time of the text element will also be reduced by 2 seconds along with the card duration. At this time, the card duration is 1 second, and the starting time of the text element relative to the card is 0 second.

The above technical solution of this embodiment provides more details for the step of adjusting the starting and stopping playback times of the material elements according to the adjusted target card playback duration. For the case of reducing the card playback duration, the starting and stopping playback times of the material elements are correspondingly reduced; and for the case of increasing the card playback duration, the starting and stopping playback times of the material elements are correspondingly increased, thus realizing the function of adjusting the playback duration of the material elements contained in the target card according to the target card playback duration, and providing diversity for video production based on the material template.

As a fourth alternative embodiment of this embodiment, on the basis of the above embodiment, the card editing area can be optimized to include a text dubbing control relative to the material card.

In this embodiment, a text dubbing control relative to the material card is also added in the card editing area, and the edited text can be dubbed by triggering the text dubbing control.

In an example, the method further includes:

in response to a triggering operation for the text dubbing control, displaying a text dubbing editing area; the text dubbing editing area contains an intelligent voice dubbing item and/or a virtual character dubbing item.

In this embodiment, when the video producer wants to dub the text, he/she can trigger the text dubbing control in the card editing area. In this step, it can receive a response to the triggering operation for the text dubbing control. For example, in response to the triggering operation for the text dubbing control, a text dubbing editing area containing intelligent voice dubbing item and/or virtual character dubbing item can be displayed. Among them, the intelligent voice configuration item or the virtual character dubbing item in the text dubbing editing area can include multiple options for video producers to choose.

According to the above technical solution, a text dubbing control is added in the card editing area, and dubbing items available for video production are displayed by triggering the text dubbing control, so that the function of text dubbing for the material card is added.

For example, after displaying the text dubbing editing area, the method is optimized to include the following steps:

a6) in response to a selection operation for the intelligent voice dubbing item, displaying a first dubbing editing box.

After the text dubbing editing area is displayed, the video producer can perform a selection operation for the intelligent voice dubbing item in the text dubbing editing area. For example, after receiving the selection operation for the intelligent voice dubbing item, the executive subject can present a dubbing editing box through underlying analysis, which is referred to as the first dubbing editing box in this embodiment.

b6) acquiring first dubbing attribute information edited in the first dubbing editing box, wherein the first dubbing attribute information includes dubbed content information and dubbing voice timbre information.

In this embodiment, the video producer can edit the dubbing attribute information in the first dubbing editing box, and the edited, dubbing attribute information in the first dubbing editing box is referred to as the first dubbing attribute information. The first dubbing attribute information includes dubbed content information and dubbing voice timbre information. For example, the dubbed content information can refer to the specific text content as edited, and the dubbing voice timbre information can refer to different types of voice timbre information. The dubbing voice timbre can be classified according to the age and the role, which is not particularly limited here. This step is configured to obtain the dubbed content information and dubbing voice timbre information edited in the first dubbing editing box.

c6) forming first dubbed content of the material card according to the first dubbing attribute information.

For example, after obtaining the first dubbing attribute information, the first dubbed content of the material card is formed according to the first dubbing attribute information.

d6) after receiving a playback triggering operation for the material card, playing the first dubbed content when dubbed playback conditions are satisfied.

For example, after receiving the playback triggering operation for the material card, the first dubbed content is played when the dubbed playback conditions are satisfied, which is equivalent to playing the dubbed content information by using the dubbing voice timbre information during playing.

It should be noted that in the case where a text is configured in the material card and an animation effect is set on the text, when the playback progress bar of the material card is dragged, the configured text will be set to play corresponding animation effects along with the advancement of the progress bar, such as the entrance effect and exit effect of the texts, etc. However, if the video producer wants to select texts for editing when playing the card but the texts are presented with animation effects, it is not convenient to select the texts. In order to solve the above problems, in this embodiment, the texts are locked during playing the material card for editing, i.e., the animation effects of the texts are not presented when playing the card, so that it is convenient to select and edit the texts at any time by clicking a file selection box during playing the material card. It is equivalent to locking the texts in the process of trial-playback of the material card without displaying the animation effects of the texts, which provides convenience to select the texts at any time for corresponding editing during the trial-playback of the material card.

The technical solution of this embodiment adds the function of playing dubbed content after displaying the text dubbing editing area, and the dubbing editing box can be presented by a selection operation for the intelligent voice dubbing item. Based on the editing operation for the dubbing editing box, the edited dubbed content can be played when the material card is played, which adds the dubbing function to the material edition and realizes the diversity of the material edition.

For example, after displaying the text dubbing editing area, the method includes the following steps:

a7) in response to a selection operation for the virtual character dubbing item, displaying a second dubbing editing box.

The configuration of virtual characters can also be realized in this embodiment. For example, after receiving the selection operation for the virtual character dubbing item, a dubbing editing box can be displayed, which is referred to as the second dubbing editing box in this embodiment.

b7) acquiring second dubbing attribute information edited in the second dubbing editing box, wherein the second dubbing attribute information includes dubbed content information, dubbing voice timbre information and virtual character image information.

In this embodiment, the video producer can edit the dubbing attribute information in the second dubbing editing box, and the edited, dubbing attribute information in the second dubbing editing box is referred to as the second dubbing attribute information. The second dubbing attribute information includes dubbed content information, dubbing voice timbre information, and virtual character image information. Among them, the virtual character image information means that a corresponding character can be configured to imitate dubbing. This step is configured to obtain the dubbed content, dubbing voice timbre information and virtual character image information which are edited in the second dubbing editing box.

c7) forming a second dubbed content of the material card according to the second dubbing attribute information.

For example, after obtaining the second dubbing attribute information, the second dubbed content of the material card is formed according to the second dubbing attribute information.

d7) after receiving the playback triggering operation for the material card, playing the second dubbed content when the dubbed playback conditions are satisfied, wherein the second dubbed content includes the virtual character displayed in the material card according to the preset image.

In this embodiment, after adding a virtual character, the virtual character can be understood as a material element in the material card. For example, after receiving the playback triggering operation for the material card, the second dubbed content is played when the dubbed playback conditions are satisfied, which is equivalent to displaying the virtual character in the playing screen according to the preset image and playing the dubbed content information by using the dubbing voice timbre information. In addition, the display position of the virtual character can also be adjusted.

In this embodiment, an image of a dubbed virtual character is presented, and the underlying technology is supported by a platform that takes up less resources than the existing one and can synthesize the dubbed virtual character more quickly, so that it can quickly synthesize the dubbed virtual character on this platform to support the realization of the dubbed virtual character in this embodiment. In addition, it can also set intelligent actions for the dubbed virtual characters, which can be used by video producers to customize what actions they choose to perform.

The above-mentioned technical solution of this embodiment adds the setting of dubbed virtual characters. Different from the existing video production by directly applying material template in which virtual characters cannot be synthesized, in this technical solution, the second dubbing editing box can be presented through a selection operation for the dubbing items of virtual characters, and the dubbed content, voice timbre information and virtual characters of the material card can be set. When the material card is played, the virtual characters are displayed at the same time according to the edited dubbed content, which realizes the diversity of material edition and enables the produced video to be more vivid and interesting.

For example, the virtual character in the second dubbed content is used as a material element of the material card.

The starting and stopping playback times of the virtual character are adjusted in the material card through the time adjustment item corresponding to the virtual character.

The display level of the virtual character is adjusted in the material card through the level adjustment item corresponding to the virtual character.

The virtual character is deleted from the material card through the corresponding deletion item.

For example, the virtual character in the second dubbed content can be regarded as a material element in the material card. Like other material elements, in this embodiment, the starting and stopping playback times of the virtual character can be adjusted, the display level of the virtual character can be adjusted, and the virtual character can be deleted. The editing of the virtual character can be triggered through corresponding function items, such as time adjustment item, level adjustment item and deletion item.

The above technical solution of this embodiment adds the editing operation for the virtual character in the second dubbed content, takes the virtual character as a material element in the material card, and can realize the functions of time adjustment, level adjustment and deletion of the virtual character by triggering the corresponding function items.

As a fifth alternative embodiment of this embodiment, on the basis of the above-mentioned embodiment, in response to a triggered video presentation operation, playing the video content in the video presentation interface, which can be optimized to include the following steps:

a8) receiving a video presentation operation, wherein the video presentation operation is a triggering operation for a video presentation control presented in the material adding area.

Among them, the video presentation control is configured to trigger video playback, and the video presentation control is presented in the material adding area. When it's expected to play the produced video, the video presentation control presented in the material adding area can be triggered. For example, this step is configured to receive the video presentation operation.

b8) displaying a playback mode selection window, wherein the playback mode selection window includes playing from the currently selected card and playing from the first card position.

In this step, in response to the received video presentation operation, the playback mode selection window is displayed by executing corresponding logics. Among them, the playback mode selection window will display two options of playing from the currently selected card and playing from the first card position, and the options in the playback mode selection window can be selected according to the playback requirements. Among them, playing from the currently selected card can be considered as merging the current material card and the subsequent material cards in the material adding area, and playing from the current material card; playing from the first card position can be considered as playing the material elements of all the material cards in the material adding area, and playing from the first card.

By way of example, FIG. 5 shows a schematic diagram of the playback mode selection window presented in the video production interface displayed in the video production method provided by this embodiment. As can be seen from FIG. 5, when the video presentation control 12 in the material adding area 10 included in the video production interface 5 is triggered, a playback mode selection window 121 will be presented, and the playback mode selection window 121 contains two options to choose from playing from the currently selected card and playing from the first card position, so that different playback modes can be performed as required.

c8) in response to the triggering operation for playing from the currently selected card, performing content merging on the material elements of the currently selected material card and the material cards arranged subsequent to the currently selected material card to form the video content to be played in the presented video presentation interface.

In this embodiment, as one of the video playback modes, when the triggering operation for playing from the currently selected card is received, this step is configured to respond to the triggering operation for playing from the currently selected card, and merge the contents of the material elements in the currently selected material card and the material cards arranged subsequent to the currently selected material card by executing the corresponding logics, so as to form the video content which will be played on the presented video presentation interface.

d8) in response to the triggering operation for playing from the first card position, performing content merging based on the material elements of all the material cards in the material adding area to form the video content to be played in the presented video presentation interface.

In this embodiment, as another video playback mode, when the triggering operation for playing from the first card position is received, this step is configured to respond to the triggering operation for playing from the first card position, and merge the contents of the material elements of all the material cards in the material adding area to form the video content, which will be played on the presented video presentation interface.

The above technical solution of this embodiment provides more details regarding the step of playing the video content in the video presentation interface in response to the triggered video presentation operation. By receiving the video presentation operation, the video producer is presented with a playback mode selection window for him/her to select the required video playback mode, and the video content is synthesized based on the selected video playback mode, thus completing the production and playback of the video. The video produced by the above method of this embodiment can realize the selection of playback mode and the content to be played as required, which increases the diversity of video production.

As a sixth alternative embodiment of this embodiment, on the basis of the above embodiment, before displaying the material card for video production in the material adding area of the displayed video production interface, the method can be further optimized to include the following steps:

a9) displaying the video production interface.

In this embodiment, the displayed video production interface corresponds to the video production task, and one video production interface is displayed for each video production task. Before starting to produce a new video, it can create a task corresponding to the video to be produced by triggering a video production task creation control. Creating a task is equivalent to entering a video production entrance. By creating a task, it can enter a new video production interface and display the video production interface.

b9) selecting at least one material template to be added to the material adding area from a template view box of a video template function item included in the video production interface.

In this embodiment, the video production interface can include an area for displaying the material templates, which area can contain a video template function item. A template view box is displayed by triggering the video template function item, and the template view box contains a designed and produced material template. The material template can be a material template that comes with the video production platform. It can be considered that the material template that comes with the video production platform was set by the developer when the video production platform was developed, and this kind of material template can be included under the category of "Template Library". The material template can also be a material template saved by the video producer after editing by himself/herself, and this kind of material template can be included under the category of "My Template". Of course, the material templates can also be classified by other tagged categories, so that the material templates under a tagged category can be displayed by clicking a control of this tagged category. For example, the material templates can also be displayed in the form of "Team Template".

For example, when the video producer wants to use a material template for video production, he/she can select the material template to be added to the material adding area from the template view box in the video production interface. He/she can choose one material template or multiple material templates. After selecting the required material template from the template view box, it can add the selected material template to the material adding area by triggering an adding control in the area of designed and produced material templates.

c9) and/or, in response to the triggering operation for the material production control presented in the material adding area, presenting a newly created blank template to be edited in the material adding area.

It's also possible to display the material card in the material adding area by newly created a blank template to be edited. A blank template to be edited is created by triggering a template adding control. For example, there is a blank material adding control in the video production interface, and the blank template to be edited can be added to the material adding area by triggering the blank material adding control.

By way of example, FIG. 6 shows a schematic diagram of adding a material template in the video production interface displayed in the video production method provided by this embodiment. As can be seen from FIG. 6, a template view box 41 of the video template function item 40 included in the video production interface 6 contains material templates, which can be added into the material adding area. As shown in FIG. 6, there are "Material Template Library", "My Material" and "Import". When the "Material Template Library" is selected, there are material template 1, material template 2, material template 3, material template 4, material template 5 and material template 6 to be added into the material adding area. In addition, in the material adding area 10, there is also a material production control 13. A new blank template to be edited can be created by triggering the material production control 13.

The above technical solution provides more details regarding how to add the material card into the material adding area for video production. Different from the existing video production by directly applying material template in which the material template is added to the editing track, in this technical solution, the material template to be edited is added to the material adding area in the form of a material card, which provides a basis for editing the material card.

As a seventh alternative embodiment of this embodiment, on the basis of the above embodiment, the video production interface may further include an export control.

Among them, the export control is configured to export the video after the video production is completed.

For example, the method further includes:

a10) in response to a triggering operation for the export control, presenting an export mode selection window, wherein the export mode selection window contains a video generating control and a template saving control.

This alternative embodiment can save the produced video as a video or a template, and trigger the export control when the video producer wants to perform the corresponding operation. In this step, in response to the triggering operation for the export control, the export mode selection window will be displayed after the corresponding logical response is executed. The export mode selection window contains a video generating control and a template saving control. By triggering the video generating control, the produced video can be saved as a video; and by triggering the template saving control, the produced video can be saved as a template.

b10) in response to a triggering operation for the video generating control, synthesizing and saving a target video based on the material elements of all the material cards in the material adding area.

For example, when the triggering operation for the video generating control is received, this step responds to the triggering operation for the video generating control, synthesizes a video based on the material elements of all the material cards in the material adding area, and saves the video as a target video.

c10) in response to a triggering operation for the template saving control, synthesizing and saving a target template based on the material elements of all the material cards in the material adding area, and presenting the target template in the template view box of the video template function item included in the video production interface.

For example, when the triggering operation for the template saving control is received, this step responds to the triggering operation for the template saving control, synthesizes a template based on the material elements of all the material cards in the material adding area, and saves the template as a target template. The target template can be presented in the template view box of the video template function item included in the video production interface for the use of video producers or other personnel. For example, the target template can be saved under the category of "My Template" in the template view box.

The above technical solution of this embodiment provides the video producer with the function of saving the video or template, and the video producer can save the produced video as a video or a template by triggering the video generating control or the template saving control after completing the video production. In this way, the video can be saved according to the needs of video producers, which provides convenience for video producers.

FIG. 7 is a schematic structural diagram of a video production device provided by an embodiment of the present disclosure. As shown in FIG. 7, the device includes a card display module 31, a material display module 32, and a video playback module 33.

The card display module 31 is configured to display a material card for video production in a material adding area of a displayed video production interface, wherein the material card is a selected and added material template and/or a newly created blank template to be edited.

The material display module 32 is configured to display, in a card editing area of the video production interface, one or more material elements contained in the selected material card in response to a selection operation for the material card in the material adding area, wherein each material element in the card editing area has edition authority, and the material element is selected from a element template set in advance or imported from outside and is added in the card editing area.

The video playback module 33 is configured to play a video content in the video presentation interface in response to a triggered video presentation operation, wherein the video content is formed based on at least one material card containing the material element in the material adding area.

The video production device provided by the embodiment of the present disclosure is equivalent to providing a simple and easy-to-operate video production platform for video producers, on which a video production interface of the video to be produced can be presented, and the video production interface can provide the video producers with relevant functions for editing the material template. Different from the existing video production by directly applying material template, which only allows the video producer to replace the material content contained in the material template on the editing track but does not allow the video producer to edit the material elements or add new material elements, the concept of card editing area is introduced into the video production interface presented in this embodiment, so that one or more material elements contained in the selected material card can be displayed in the card editing area, and all the material elements in the card editing area have the edition authority and the authority to add new material elements. The material template provided by this embodiment is displayed in the form of a material card, and the material elements contained in the material card can be displayed in the card editing area with edition authority, and can also be imported from the outside and added in the card editing area, so that the video producer can edit the material card, which better matches the production requirements of the video producer, ensures the flexibility of editing the material template, provides basic support for subsequent effective and diversified video production, satisfies the individual and personalized requirements of the video producer, enriches the video editing forms, and guarantees the flexibility of video production.

For example, the device may further include a first operation module.

The first operation module can be configured to, after displaying, in the card editing area of the video production interface, one or more material elements contained in the selected material card:

receive a first selection operation, wherein the first selection operation is a selection of any material element displayed in the card editing area, and the selected material element is referred to as a first selected element;

determine and display an editing column matched with an element type of the first selected element, wherein the editing column contains at least one editable item;

adjust a related element attribute of the first selected element in the material card through editing information edited for the first selected element in the editing column.

For example, the element type of the material element includes at least one selected from the group consisted of audio type, video type, picture type, texture type, text type and chart type.

The editable item in each of the editing columns corresponding to different element types includes a time adjustment item, a level adjustment item and a deletion item.

The editable item in each of the editing columns corresponding to the audio type, the video type, the picture type and the texture type further includes one or more selected from the group consisted of transparency, trimming size, trimming duration, horizontal flipping, vertical flipping, element replacement and animation effect.

The editable item in the editing column corresponding to the text type further includes at least one selected from the group consisted of a text editing item, an animation effect and at least one adjustment item for text format adjustment.

The editable item in the editing column corresponding to the chart type further includes a data editing item of chart.

For example, the first operation module is configured to adjust the related element attribute of the first selected element in the material card through the editing information edited for the first selected element in the editing column, which may include:

in response to a triggering operation for the time adjustment item in the editing column, acquiring element starting and stopping playback information edited in a presented time adjustment window; and adjusting a first related element attribute of the first selected element in the material card according to the element starting and stopping playback information, wherein the first related element attribute includes the element starting and stopping playback times;

wherein a playback duration formed by the element starting and stopping playback times is less than or equal to a card playback duration of the material card.

For example, the first operation module is configured to adjust the related element attribute of the first selected element in the material card through the editing information edited for the first selected element in the editing column, which may include:

in response to a triggering operation for the level adjustment item in the editing column, acquiring element level adjustment information selected in a presented level adjustment window; and adjusting a second related element attribute of the first selected element in the material card according to the element level adjustment information, wherein the second related element attribute is an element display level.

For example, the first operation module is configured to adjust the related element attribute of the first selected element in the material card through the editing information edited for the first selected element in the editing column, which may include:

in response to a triggering operation for the deletion item in the editing column, removing the first selected element from the material card, and deleting attribute information of the related element attribute corresponding to the first selected element.

For example, the device may further include a first response module, the first response module may be configured to, after receiving the first selection operation:

in response to a first dragging event on the first selected element, adjust a display position of the first selected element in the material card by following a cursor movement position of the first dragging event; and in response to a first selected movement event on any side or any corner of a selected frame presented by the first selected element, adjust a display size of the first selected element in the material card by following a cursor movement position of the first selected movement event.

For example, the device may further include a second operation module, the second operation module may be configured to, after displaying, in the card editing area of the video production interface, one or more material elements contained in the selected material card:

receive a second selection operation, wherein the second selection operation is a selection of at least two material elements displayed in the card editing area, and the selected material elements are referred to as a second selected element;

in response to a second dragging event on the second selected element, adjust a display position of the second selected element in the material card by following a cursor movement position of the second dragging event; and in response to a second selected movement event on any side or any corner of a selected frame presented by the second selected element, adjust a display size of the second selected element in the material card by following a cursor movement position of the second selected movement event.

For example, the video production interface also includes a material production navigation column, the material production navigation column includes at least one of the following function items for material production: a video function item, a picture function item, a text function item, a texture function item, a background music function item, a sound effect function item and a chart function item; function view boxes corresponding to different function items each contain material information of at least one material and an element import control for external import.

For example, the card editing area contains a playback progress bar relative to the material card and a progress adjustment control presented on the playback progress bar, and/or, the card editing area contains a card duration adjustment item relative to the material card. The device may further include a second response module and a third response module.

The second response module is configured to, in response to a third dragging event on the progress adjustment control, adjust a material content of the material card presented in the card editing area by following a cursor movement position of the third dragging event.

The third response module is configured to, in response to a triggering operation for the card duration adjustment item, acquire card starting and stopping playback information edited in a presented card duration adjustment window, and adjust a card playback duration of the material card according to the card starting and stopping playback information to obtain a target card playback duration.

For example, the device may further include a fifth response module, and the fifth response module, after adjusting the card playback duration of the material card according to the card starting and stopping playback information, can be configured to adjust element starting and stopping playback times of the material element contained in the material card according to the target card playback duration to obtain target element starting and stopping time, wherein a target playback duration constituted by the target element starting and stopping times is less than or equal to the target card playback duration.

For example, the card editing area contains a text dubbing control relative to the material card, and the device further includes a sixth response module, which can be configured to display a text dubbing editing area in response to a triggering operation for the text dubbing control, wherein the text dubbing editing area contains an intelligent voice dubbing item and/or a virtual character dubbing item.

For example, the device may further include a seventh response module, and the seventh response module, after displaying the text dubbing editing area, can be configured to:

display a first dubbing editing box in response to a selection operation for the intelligent voice dubbing item;

acquire first dubbing attribute information edited in the first dubbing editing box, wherein the first dubbing attribute information includes dubbed content information and dubbing voice timbre information;

form a first dubbed content of the material card according to the first dubbing attribute information; and play the first dubbed content if a dubbed playback condition is satisfied after receiving a playback triggering operation for the material card.

For example, the device may further include an eighth response module, and the eighth response module, after displaying the text dubbing editing area, can be configured to:

display a second dubbing editing box in response to a selection operation for the virtual character dubbing item;

acquire second dubbing attribute information edited in the second dubbing editing box, wherein the second dubbing attribute information includes dubbed content information, dubbing voice timbre information and virtual character image information;

form a second dubbed content of the material card according to the second dubbing attribute information; and play the second dubbed content if a dubbed playback condition is satisfied after receiving a playback triggering operation for the material card, wherein the second dubbed content contains a virtual character displayed in the material card according to a preset image.

For example, the virtual character in the second dubbed content is used as a material element of the material card.

For example, the element starting and stopping playback times of the virtual character are adjusted in the material card through the time adjustment item corresponding to the virtual character.

For example, the element display level of the virtual character is adjusted in the material card through the level adjustment item corresponding to the virtual character.

For example, the virtual character is deleted from the material card through the corresponding deletion item.

For example, the video playback module 33 can be configured to:

receive the video presentation operation, wherein the video presentation operation is a triggering operation for a video presentation control presented in the material adding area;

display a playback mode selection window, wherein the playback mode selection window includes options of playing from a currently selected card and playing from a first card position;

merge contents of material elements of a currently selected material card and material cards arranged subsequent to the currently selected material card to form the video content to be played in the video presentation interface, in response to a triggering operation for the option of playing from the currently selected card;

merge contents of material elements of all the material cards in the material adding area to form the video content to be played in the video presentation interface, in response to a triggering operation for the option of playing from the first card position.

For example, the device also includes a ninth response module, and the ninth response module, before displaying the material card for video production in the material adding area of the displayed video production interface, can be configured to:

display the video production interface;

selected at least one material template to be added into the material adding area from a template view box of a video template function item contained in the video production interface;

and/or, display a newly created blank template to be edited in the material adding area in response to a triggering operation for a material production control presented in the material adding area.

The video production device provided by the embodiment of the present disclosure can execute the video production method provided by any embodiment of the present disclosure, and has corresponding functional modules and beneficial effects.

It is worth noting that each unit and module included in the above device is only divided according to functional logics, but it is not limited to the above division, as long as the corresponding functions can be realized. In addition, the specific names of these functional units are only for the convenience of distinguishing them from each other, and are not intended to limit the protection scope of the disclosed embodiments.

FIG. 8 is a schematic structural diagram of an electronic apparatus provided by an embodiment of the present disclosure. Reference is now made to FIG. 8, which shows a structural schematic diagram of an electronic apparatus (such as a terminal device or a server in FIG. 8) 400 suitable for implementing an embodiment of the present disclosure. The terminal devices in the embodiment of the present disclosure may include, but are not limited to, mobile terminals such as mobile phones, notebook computers, digital broadcast receivers, PDA (Personal Digital Assistant), PAD (Tablet Computer), PMP (Portable Multimedia Player), vehicle-mounted terminals (such as vehicle-mounted navigation terminals), and fixed terminals such as digital TV and desktop computers. The electronic apparatus shown in FIG. 8 is only an example, and should not bring any limitation to the function and application scope of the embodiment of the present disclosure.

As shown in FIG. 8, an electronic apparatus 400 may include a processing device (such as a central processing unit, a graphics processor, etc.) 401, which may perform various appropriate actions and processes according to a program stored in a read-only memory (ROM) 402 or a program loaded from a storage device 408 into a random-access memory (RAM) 403. In the RAM 403, various programs and data required for the operation for the electronic apparatus 400 are also stored. A processing device 401, a ROM 402 and a RAM 403 are connected to each other through a bus 404. An editing/output (I/O) interface 405 is also connected to the bus 404.

Generally, the following devices can be connected to the I/O interface 405: an input device 406 including, for example, a touch screen, a touch pad, a keyboard, a mouse, a camera, a microphone, an accelerometer, a gyroscope, etc.; an output device 407 including, for example, a liquid crystal display (LCD), a speaker, a vibrator, etc.; a storage device 408 such as a magnetic tape, a hard disk, etc.; and a communication device 409. The communication device 409 may allow the electronic apparatus 400 to perform wireless or wired communication with other devices to exchange data. Although FIG. 8 shows an electronic apparatus 400 with various devices, it should be understood that it is not required to implement or have all the devices as shown. More or fewer devices may alternatively be implemented or provided.

In particular, according to an embodiment of the present disclosure, the process described above with reference to the flowchart can be implemented as a computer software program. For example, an embodiment of the present disclosure includes a computer program product including a computer program carried on a non-transitory computer-readable medium, which contains program code for executing the method shown in the flowchart. In such an embodiment, the computer program can be downloaded and installed from the network through the communication device 409, or installed from the storage device 408, or installed from the ROM 402. When the computer program is executed by the processing device 401, the above functions defined in the method of the embodiment of the present disclosure are performed.

Names of messages or information exchanged among multiple devices in the embodiment of the present disclosure are only used for illustrative purposes, and are not configured to limit the scope of these messages or information.

The electronic apparatus provided by the embodiment of the present disclosure belongs to the same inventive concept as the video production method provided by the above embodiment, and the technical details not described particularly in this embodiment can be found in the above embodiment, and this embodiment has the same beneficial effects as the above embodiment.

An embodiment of the present disclosure provides a computer storage medium on which a computer program is stored, and the computer storage, when executed by a processor, realizes the video production method provided in the above embodiment.

It should be noted that the computer-readable medium mentioned above in the present disclosure can be a computer-readable signal medium or a computer-readable storage medium or any combination of the two. The computer-readable storage medium can be, for example, but not limited to, an electrical, magnetic, optical, electromagnetic, infrared, or semiconductor system, apparatus or device, or a combination of any of the above. More specific examples of computer-readable storage medium may include, but are not limited to, an electrical connection with one or more wires, a portable computer disk, a hard disk, a random-access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination of the above. In the present disclosure, a computer-readable storage medium can be any tangible medium containing or storing a program, which can be used by or in combination with an instruction execution system, apparatus or device. In the present disclosure, a computer-readable signal medium may include a data signal propagated in baseband or as part of a carrier wave, in which computer-readable program codes are carried. This propagated data signal can take many forms, including but not limited to electromagnetic signals, optical signals or any suitable combination of the above. A computer-readable signal medium can also be any computer-readable medium other than a computer-readable storage medium, which can send, propagate or transmit a program for use by or in connection with an instruction execution system, apparatus or device. The program code contained in the computer-readable medium can be transmitted by any suitable medium, including but not limited to: wires, optical cables, RF (radio frequency) and the like, or any suitable combination of the above.

In some embodiments, the client and the server can communicate by using any currently known or future developed network protocol such as HTTP (HyperText Transfer Protocol), and can be interconnected with digital data communication in any form or medium (for example, communication network). Examples of communication networks include a local area network ("LAN"), a wide area network ("WAN"), the Internet (for example, the Internet) and end-to-end networks (for example, ad hoc end-to-end networks), as well as any currently known or future developed networks.

The computer-readable medium may be included in the electronic apparatus; or it can exist alone without being assembled into the electronic apparatus.

The computer-readable medium carries one or more programs, and when the one or more programs are executed by the electronic apparatus, the electronic apparatus is configured for:

displaying a material card for video production in a material adding area of a displayed video production interface, wherein the material card is a selected and added material template and/or a newly created blank template to be edited;

in response to a selection operation for the material card in the material adding area, displaying, in a card editing area of the video production interface, one or more material elements contained in the selected material card, wherein each material element in the card editing area has edition authority, and the material element is selected from an element template set in advance or imported from outside and is added in the card editing area; and in response to a triggered video presentation operation, playing a video content in a video presentation interface, wherein the video content is formed based on at least one material card containing the material element in the material adding area.

Computer program codes for performing the operations of the present disclosure may be written in one or more programming languages or their combinations, including but not limited to object-oriented programming languages, such as Java, Smalltalk, C++, and conventional procedural programming languages, such as "C" language or similar programming languages. The program code can be completely executed on the user's computer, partially executed on the user's computer, executed as an independent software package, partially executed on the user's computer and partially executed on a remote computer, or completely executed on a remote computer or server. In the case involving a remote computer, the remote computer may be connected to a user computer through any kind of network, including a local area network (LAN) or a wide area network (WAN), or may be connected to an external computer (for example, through the Internet using an Internet service provider).

The flowcharts and block diagrams in the drawings illustrate the architecture, functions and operations of possible implementations of systems, methods and computer program products according to various embodiments of the present disclosure. In this regard, each block in the flowchart or block diagram may represent a module, a program segment, or a part of code that contains one or more executable instructions for implementing specified logical functions. It should also be noted that in some alternative implementations, the functions noted in the blocks may occur in a different order than those illustrated in the drawings. For example, two blocks shown in succession may actually be executed substantially in parallel, and they may sometimes be executed in the reverse order, depending on the functions involved. It should also be noted that each block in the block diagrams and/or flowcharts, and combinations of blocks in the block diagrams and/or flowcharts, can be implemented by a dedicated hardware-based system that performs specified functions or operations, or by a combination of dedicated hardware and computer instructions.

The units involved in the embodiment described in the present disclosure can be realized by software or hardware. Among them, the name of the unit does not constitute the limitation of the unit itself in some cases. For example, the first acquisition unit can also be described as "the unit that acquires at least two Internet protocol addresses".

The functions described above herein may be at least partially performed by one or more hardware logic components. For example, without limitation, exemplary types of hardware logic components that can be used include: Field Programmable Gate Array (FPGA), Application Specific Integrated Circuit (ASIC), Application Specific Standard Product (ASSP), System on Chip (SOC), Complex Programmable Logic Device (CPLD) and so on.

In the context of the present disclosure, a machine-readable medium may be a tangible medium that may contain or store a program for use by or in connection with an instruction execution system, apparatus or device. The machine-readable medium may be a machine-readable signal medium or a machine-readable storage medium. A machine-readable medium may include, but is not limited to, an electronic, magnetic, optical, electromagnetic, infrared, or semiconductor system, device or apparatus, or any suitable combination of the above. More specific examples of the machine-readable storage medium may include an electrical connection based on one or more lines, a portable computer disk, a hard disk, a random-access memory (RAM), a read-only memory (ROM), an erasable programmable read-only memory (EPROM or flash memory), an optical fiber, a convenient compact disk read-only memory (CD-ROM), an optical storage device, a magnetic storage device, or any suitable combination of the above.

According to one or more embodiments of the present disclosure, [Example 1] provides a video production method, which includes:

displaying a material card for video production in a material adding area of a displayed video production interface, wherein the material card is a selected and added material template and/or a newly created blank template to be edited;

in response to a selection operation for the material card in the material adding area, displaying, in a card editing area of the video production interface, one or more material elements contained in the selected material card, wherein each material element in the card editing area has edition authority, and the material element is selected from an element template set in advance or imported from outside and is added in the card editing area;

in response to a triggered video presentation operation, playing a video content in a video presentation interface, wherein the video content is formed based on at least one material card containing the material element in the material adding area.

According to one or more embodiments of the present disclosure, [Example 2] provides a video production method which can be optimized after the displaying, in the card editing area of the video production interface, one or more material elements contained in the selected material card, further including:

receiving a first selection operation, wherein the first selection operation is a selection of any material element displayed in the card editing area, and the selected material element is referred to as a first selected element;

determining and displaying an editing column matched with an element type of the first selected element, wherein the editing column contains at least one editable item;

adjusting a related element attribute of the first selected element in the material card through editing information edited for the first selected element in the editing column.

According to one or more embodiments of the present disclosure, [Example 3] provides a video production method, which can be optimized such that:

the element type of the material element includes at least one selected from the group consisted of audio type, video type, picture type, texture type, text type and chart type;

the editable item in each of the editing columns corresponding to different element types includes a time adjustment item, a level adjustment item and a deletion item;

the editable item in each of the editing columns corresponding to the audio type, the video type, the picture type and the texture type further includes one or more selected from the group consisted of transparency, trimming size, trimming duration, horizontal flipping, vertical flipping, element replacement and animation effect;

the editable item in the editing column corresponding to the text type further includes at least one selected from the group consisted of a text editing item, an animation effect and at least one adjustment item for text format adjustment; and the editable item in the editing column corresponding to the chart type further includes a data editing item of chart.

According to one or more embodiments of the present disclosure, [Example 4] provides a video production method, in which the adjusting the related element attribute of the first selected element in the material card through the editing information edited for the first selected element in the editing column, includes:

in response to a triggering operation for the time adjustment item in the editing column, acquiring element starting and stopping playback information edited in a presented time adjustment window; and adjusting a first related element attribute of the first selected element in the material card according to the element starting and stopping playback information, wherein the first related element attribute includes element starting and stopping playback times;

wherein a playback duration formed by the element starting and stopping playback time is less than or equal to a card playback duration of the material card.

According to one or more embodiments of the present disclosure, [Example 5] provides a video production method, in which the adjusting the related element attribute of the first selected element in the material card according to the editing information edited for the first selected element in the editing column, includes:

in response to a triggering operation for the level adjustment item in the editing column, acquiring element level adjustment information selected in a presented level adjustment window; and adjusting a second related element attribute of the first selected element in the material card according to the element level adjustment information, wherein the second related element attribute is an element display level.

According to one or more embodiments of the present disclosure, [Example 6] provides a video production method, which can optionally optimize the adjusting the related element attribute of the first selected element in the material card according to the editing information edited for the first selected element in the editing column, including:

in response to a triggering operation for the deletion item in the editing column, removing the first selected element from the material card, and deleting attribute information of the related element attribute corresponding to the first selected element.

According to one or more embodiments of the present disclosure, [Example 7] provides a video production method, which can be optimized such that, after receiving the first selection operation, further including:

in response to a first dragging event on the first selected element, adjusting a display position of the first selected element in the material card by following a cursor movement position of the first dragging event; and in response to a first selected movement event on any side or any corner of a selected frame presented by the first selected element, adjusting a display size of the first selected element in the material card by following a cursor movement position of the first selected movement event.

According to one or more embodiments of the present disclosure, [Example 8] provides a video production method, which can be optimized such that, after displaying, in the card editing area of the video production interface, one or more material elements contained in the selected material card, further including:

receiving a second selection operation, wherein the second selection operation is a selection of at least two material elements displayed in the card editing area, and the selected material elements are referred to as a second selected element;

in response to a second dragging event on the second selected element, adjusting a display position of the second selected element in the material card by following a cursor movement position of the second dragging event; and in response to a second selected movement event on any side or any corner of a selected frame presented by the second selected element, adjusting a display size of the second selected element in the material card by following a cursor movement position of the second selected movement event.

According to one or more embodiments of the present disclosure, [Example 9] provides a video production method, which can be optimized such that:

the video production interface further includes a material production navigation column, the material production navigation column includes at least one of the following function items for material production: a video function item, a picture function item, a text function item, a texture function item, a background music function item, a sound effect function item and a chart function item; and function view boxes corresponding to different function items each contain material information of at least one material and an element import control for external import.

According to one or more embodiments of the present disclosure, [Example 10] provides a video production method, which can be optimized such that the card editing area contains a playback progress bar relative to the material card and a progress adjustment control presented on the playback progress bar, and/or, the card editing area contains a card duration adjustment item relative to the material card.

Optionally, the method further includes:

in response to a third dragging event on the progress adjustment control, adjusting a material content of the material card presented in the card editing area by following a cursor movement position of the third dragging event; and/or, in response to a triggering operation for the card duration adjustment item, acquiring card starting and stopping playback information edited in a presented card duration adjustment window, and adjusting a card playback duration of the material card according to the card starting and stopping playback information to obtain a target card playback duration.

According to one or more embodiments of the present disclosure, [Example 11] provides a video production method, which can be optimized such that after adjusting the card playback duration of the material card according to the card starting and stopping playback information to obtain the target card playback duration, further including:

adjusting element starting and stopping playback time of the material element contained in the material card according to the target card playback duration to obtain target element starting and stopping times;

wherein a target playback duration constituted by the target element starting and stopping times is less than or equal to the target card playback duration.

According to one or more embodiments of the present disclosure, [Example 12] provides a video production method, which can be optimized such that the card editing area contains a text dubbing control relative to the material card.

Optionally, the method further includes:

displaying a text dubbing editing area in response to a triggering operation for the text dubbing control;

wherein the text dubbing editing area contains an intelligent voice dubbing item and/or a virtual character dubbing item.

According to one or more embodiments of the present disclosure, [Example 13] provides a video production method, which can be optimized such that, after displaying the text dubbing editing area, further including:

displaying a first dubbing editing box in response to a selection operation for the intelligent voice dubbing item;

acquiring first dubbing attribute information edited in the first dubbing editing box, wherein the first dubbing attribute information includes dubbed content information and dubbing voice timbre information;

forming a first dubbed content of the material card according to the first dubbing attribute information; and after receiving a playback triggering operation for the material card, playing the first dubbed content if a dubbed playback condition is satisfied.

According to one or more embodiments of the present disclosure, [Example 14] provides a video production method, which can be optimized such that, after displaying the text dubbing editing area, further including:

displaying a second dubbing editing box in response to a selection operation for the virtual character dubbing item;

acquiring second dubbing attribute information edited in the second dubbing editing box, wherein the second dubbing attribute information includes dubbed content information, dubbing voice timbre information and virtual character image information;

forming a second dubbed content of the material card according to the second dubbing attribute information; and after receiving a playback triggering operation for the material card, playing the second dubbed content if a dubbed playback condition is satisfied, wherein the second dubbed content contains a virtual character displayed in the material card according to a preset image.

According to one or more embodiments of the present disclosure, [Example 15] provides a video production method, which can be optimized such that a virtual character in the second dubbed content is used as a material element of the material card;

the element starting and stopping playback times of the virtual character are adjusted in the material card through the time adjustment item corresponding to the virtual character;

the element display level of the virtual character is adjusted in the material card through the level adjustment item corresponding to the virtual character; and the virtual character is deleted from the material card through the corresponding deletion item.

According to one or more embodiments of the present disclosure, [Example 16] provides a video production method, in which the in response to the triggered video presentation operation, playing the video content in the video presentation interface, includes:

receiving the video presentation operation, wherein the video presentation operation is a triggering operation for a video presentation control presented in the material adding area;

displaying a playback mode selection window, wherein the playback mode selection window includes options of playing from a currently selected card and playing from a first card position;

in response to a triggering operation for the option of playing from the currently selected card, merging contents of material elements of a currently selected material card and material cards arranged subsequent to the currently selected material card to form the video content to be played in the video presentation interface;

in response to a triggering operation for the option of playing from the first card position, merging contents of material elements of all the material cards in the material adding area to form the video content to be played in the video presentation interface.

According to one or more embodiments of the present disclosure, [Example 17] provides a video production method, which can be optimized such that, before displaying the material card for video production in the material adding area of the displayed video production interface, further including:

displaying the video production interface; and selecting at least one material template to be added into the material adding area from a template view box of a video template function item contained in the video production interface;

and/or, in response to a triggering operation for a material production control presented in the material adding area, displaying a newly created blank template to be edited in the material adding area.

According to one or more embodiments of the present disclosure, [Example 18] provides a video production device, which includes:

a card display module, configured to display a material card for video production in a material adding area of a displayed video production interface, wherein the material card is a selected and added material template and/or a newly created blank template to be edited;

a material display module, configured to display, in a card editing area of the video production interface, one or more material elements contained in the selected material card in response to a selection operation for the material card in the material adding area, wherein each material element in the card editing area has edition authority, and the material element is selected from a element template set in advance or imported from outside and is added in the card editing area; and a video playback module, configured to play a video content in the video presentation interface in response to a triggered video presentation operation, wherein the video content is formed based on at least one material card containing the material element in the material adding area.

The above are merely exemplary embodiments of the present disclosure and the explanation of the applied technical principles. It should be understood by those skilled in the art that the disclosed scope involved in the present disclosure is not limited to the technical solution formed by the specific combination of the above technical features, but also covers other technical solutions formed by any combination of the above technical features or their equivalent features without departing from the above disclosure concept. For example, the technical solutions formed by the above features being replaced with (but not limited to) technical features having similar functions disclosed in the present disclosure.

Furthermore, although the operations are depicted in a particular order, this should not be understood as requiring that these operations be performed in the particular order shown or in a sequential order. Under certain circumstances, multitasking and parallel processing may be beneficial. Likewise, although several specific implementation details are contained in the above discussion, these should not be construed as limiting the scope of the present disclosure. Some features described in the context of separate embodiments can also be combined in a single embodiment. On the contrary, various features described in the context of a single embodiment can also be implemented in multiple embodiments individually or in any suitable sub-combination.

Although the subject matter has been described in language specific to structural features and/or methodological logical acts, it should be understood that the subject matter defined in the appended claims is not necessarily limited to the specific features or acts described above. On the contrary, the specific features and actions described above are only exemplary forms of implementing the claims.

The invention claimed is:

1. A video production method, comprising:

displaying a material card for video production in a material adding area of a displayed video production interface, wherein the material card is a selected and added material template and/or a newly created blank template to be edited;

in response to a selection operation for the material card in the material adding area, displaying, in a card editing area of the video production interface, one or more material elements contained in the selected material card, wherein each material element in the card editing area has edition authority, and the material element is selected from an element template set in advance or imported from outside and is added in the card editing area; and in response to a triggered video presentation operation, playing a video content in a video presentation interface, wherein the video content is formed based on at least one material card containing the material element in the material adding area, wherein an element type of the material element comprises at least one selected from the group consisted of audio type, video type, picture type, texture type, text type and chart type;

an editable item corresponding to the audio type, the video type, the picture type and the texture type comprises one or more selected from the group consisted of transparency, trimming size, trimming duration, horizontal flipping, vertical flipping, element replacement and animation effect; and the editable item corresponding to the text type comprises at least one selected from the group consisted of a text editing item, an animation effect and at least one adjustment item for text format adjustment.

2. The method according to claim 1, wherein after the displaying, in the card editing area of the video production interface, one or more material elements contained in the selected material card, further comprising:

receiving a first selection operation, wherein the first selection operation is a selection of any material element displayed in the card editing area, and the selected material element is referred to as a first selected element;

determining and displaying an editing column matched with an element type of the first selected element, wherein the editing column contains at least one of the editable items corresponding to the element type; and adjusting a related element attribute of the first selected element in the material card through editing information edited for the first selected element in the editing column.

3. The method according to claim 2, wherein the editable item in each of the editing columns corresponding to different element types further comprises a time adjustment item, a level adjustment item and a deletion item; and the editable item in the editing column corresponding to the chart type further comprises a data editing item of chart.

4. The method according to claim 3, wherein the adjusting the related element attribute of the first selected element in the material card through the editing information edited for the first selected element in the editing column, comprises:

in response to a triggering operation for the time adjustment item in the editing column, acquiring element starting and stopping playback information edited in a presented time adjustment window; and adjusting a first related element attribute of the first selected element in the material card according to the element starting and stopping playback information, wherein the first related element attribute comprises element starting and stopping playback times;

wherein a playback duration formed by the element starting and stopping playback times is less than or equal to a card playback duration of the material card.

5. The method according to claim 3, wherein the adjusting the related element attribute of the first selected element in the material card according to the editing information edited for the first selected element in the editing column, comprises:

in response to a triggering operation for the level adjustment item in the editing column, acquiring element level adjustment information selected in a presented level adjustment window; and adjusting a second related element attribute of the first selected element in the material card according to the element level adjustment information, wherein the second related element attribute is an element display level.

6. The method according to claim 3, wherein the adjusting the related element attribute of the first selected element in the material card according to the editing information edited for the first selected element in the editing column, comprises:

in response to a triggering operation for the deletion item in the editing column, removing the first selected element from the material card, and deleting attribute information of the related element attribute corresponding to the first selected element.

7. The method according to claim 2, wherein after receiving the first selection operation, further comprising:

in response to a first dragging event on the first selected element, adjusting a display position of the first selected element in the material card by following a cursor movement position of the first dragging event; and in response to a first selected movement event on any side or any corner of a selected frame presented by the first selected element, adjusting a display size of the first selected element in the material card by following a cursor movement position of the first selected movement event.

8. The method according to claim 1, wherein after displaying, in the card editing area of the video production interface, one or more material elements contained in the selected material card, further comprising:

receiving a second selection operation, wherein the second selection operation is a selection of at least two material elements displayed in the card editing area, and the selected material elements are referred to as a second selected element;

in response to a second dragging event on the second selected element, adjusting a display position of the second selected element in the material card by following a cursor movement position of the second dragging event; and in response to a second selected movement event on any side or any corner of a selected frame presented by the second selected element, adjusting a display size of the second selected element in the material card by following a cursor movement position of the second selected movement event.

9. The method according to claim 1, wherein the video production interface further comprises a material production navigation column, the material production navigation column comprises at least one of the following function items for material production: a video function item, a picture function item, a text function item, a texture function item, a background music function item, a sound effect function item and a chart function item; and

function view boxes corresponding to different function items each contain material information of at least one material and an element import control for external import.

10. The method according to claim 1, wherein the card editing area contains a playback progress bar relative to the material card and a progress adjustment control presented on the playback progress bar, and/or, the card editing area contains a card duration adjustment item relative to the material card;

the method further comprises:

in response to a third dragging event on the progress adjustment control, adjusting a material content of the material card presented in the card editing area by following a cursor movement position of the third dragging event;

and/or, in response to a triggering operation for the card duration adjustment item, acquiring card starting and stopping playback information edited in a presented card duration adjustment window, and adjusting a card playback duration of the material card according to the card starting and stopping playback information to obtain a target card playback duration.

11. The method according to claim 10, wherein after adjusting the card playback duration of the material card according to the card starting and stopping playback information to obtain the target card playback duration, further comprising:

adjusting element starting and stopping playback times of the material element contained in the material card according to the target card playback duration to obtain target element starting and stopping times;

wherein a target playback duration constituted by the target element starting and stopping times is less than or equal to the target card playback duration.

12. The method according to claim 1, wherein the card editing area contains a text dubbing control relative to the material card, the method further comprises:

displaying a text dubbing editing area in response to a triggering operation for the text dubbing control;

wherein the text dubbing editing area contains an intelligent voice dubbing item and/or a virtual character dubbing item.

13. The method according to claim 12, wherein after displaying the text dubbing editing area, further comprising:

displaying a first dubbing editing box in response to a selection operation for the intelligent voice dubbing item;

acquiring first dubbing attribute information edited in the first dubbing editing box, wherein the first dubbing attribute information comprises dubbed content information and dubbing voice timbre information;

forming a first dubbed content of the material card according to the first dubbing attribute information; and after receiving a playback triggering operation for the material card, playing the first dubbed content if a dubbed playback condition is satisfied.

14. The method according to claim 12, wherein after displaying the text dubbing editing area, further comprising:

displaying a second dubbing editing box in response to a selection operation for the virtual character dubbing item;

acquiring second dubbing attribute information edited in the second dubbing editing box, wherein the second dubbing attribute information comprises dubbed content information, dubbing voice timbre information and virtual character image information;

forming a second dubbed content of the material card according to the second dubbing attribute information; and after receiving a playback triggering operation for the material card, playing the second dubbed content if a dubbed playback condition is satisfied, wherein the second dubbed content contains a virtual character displayed in the material card according to a preset image.

15. The method according to claim 1, wherein the in response to the triggered video presentation operation, playing the video content in the video presentation interface, comprises:

receiving the video presentation operation, wherein the video presentation operation is a triggering operation for a video presentation control presented in the material adding area;

displaying a playback mode selection window, wherein the playback mode selection window comprises options of playing from a currently selected card and playing from a first card position;

in response to a triggering operation for the option of playing from the currently selected card, merging contents of material elements of a currently selected material card and material cards arranged subsequent to the currently selected material card to form the video content to be played in the video presentation interface; and in response to a triggering operation for the option of playing from the first card position, merging contents of material elements of all the material cards in the material adding area to form the video content to be played in the video presentation interface.

16. The method according to claim 1, wherein before displaying the material card for video production in the material adding area of the displayed video production interface, further comprising:

displaying the video production interface;

selecting at least one material template to be added into the material adding area from a template view box of a video template function item contained in the video production interface;

and/or, in response to a triggering operation for a material production control presented in the material adding area, displaying a newly created blank template to be edited in the material adding area.

17. An electronic apparatus, comprising:

one or more processors; and a storage device for storing one or more programs, wherein when the one or more programs are executed by the one or more processors, the one or more processors are configured to implement the method according to claim 1.

* * * * *